(12) United States Patent
Huang et al.

(10) Patent No.: US 11,675,166 B2
(45) Date of Patent: Jun. 13, 2023

(54) OPTICAL IMAGING LENS INCLUDING EIGHT LENSES OF −+−+−++−, −+−+−−+−, ++−−+−+−, ++−+−++− OR −+−−+−+− REFRACTIVE POWERS

(71) Applicant: ZHEJIANG SUNNY OPTICAL, CO., LTD, Zhejiang (CN)

(72) Inventors: Lin Huang, Zhejiang (CN); Saifeng Lv, Zhejiang (CN); Fujian Dai, Zhejiang (CN); Liefeng Zhao, Zhejiang (CN)

(73) Assignee: ZHEJIANG SUNNY OPTICAL, CO., LTD, Zhejiang (CN)

( * ) Notice: Subject to any disclaimer, the term of this patent is extended or adjusted under 35 U.S.C. 154(b) by 303 days.

(21) Appl. No.: 16/934,042

(22) Filed: Jul. 21, 2020

(65) Prior Publication Data

US 2021/0096330 A1    Apr. 1, 2021

(30) Foreign Application Priority Data

Sep. 27, 2019   (CN) .......................... 201910923460.4

(51) Int. Cl.
*G02B 13/00*    (2006.01)
*G02B 9/64*     (2006.01)

(52) U.S. Cl.
CPC ........... *G02B 13/0045* (2013.01); *G02B 9/64* (2013.01)

(58) Field of Classification Search
CPC ............................. G02B 13/0045; G02B 9/64
See application file for complete search history.

(56) References Cited

U.S. PATENT DOCUMENTS

2015/0036230 A1    2/2015 Bone et al.
2020/0363610 A1*   11/2020 Ko .............................. G02B 9/64
2020/0393653 A1*   12/2020 Chen .................. G02B 13/0045

FOREIGN PATENT DOCUMENTS

CN   107678140 A  *  2/2018  ............. G02B 13/00
JP   2017161569 A     9/2017
KR   101914042 B1    11/2018

OTHER PUBLICATIONS

CN-107678140-A, translation (Year: 2018).*

* cited by examiner

*Primary Examiner* — Wen Huang
(74) *Attorney, Agent, or Firm* — Yu Gang

(57) ABSTRACT

The disclosure discloses an optical imaging lens. The optical imaging lens sequentially from an object side to an image side along an optical axis includes, a first lens with refractive power, a second lens with positive refractive power, a third lens with negative refractive power, a fourth lens with refractive power, a fifth lens with refractive power, a sixth lens with refractive power, a seventh lens with positive refractive power and an eighth lens with negative refractive power. A total effective focal length f of the optical imaging lens and the maximum Field of View (FOV) of the optical imaging lens meet f×TAN(FOV/2)>4.0 mm; and the total effective focal length f of the optical imaging lens, a center thickness CT7 of the seventh lens on the optical axis and a CT8 of the eighth lens on the optical axis meet f/(CT7+CT8)≥5.0.

12 Claims, 35 Drawing Sheets

OPTICAL IMAGING LENS INCLUDING EIGHT LENSES OF −+−+−++−, −+−+−−+−, ++−−+−+−, ++−+−++− OR −+−−+−+− REFRACTIVE POWERS

CROSS-REFERENCE TO RELATED APPLICATION(S)

The present application claims priority to Chinese Patent Application No. 201910923460.4, filed on Sep. 27, 2019 and entitled "Optical Imaging Lens", the contents of which are hereby incorporated by reference in its entirety.

TECHNICAL FIELD

The disclosure relates to an optical imaging lens, and more particularly to an optical imaging lens including eight lenses.

BACKGROUND

In recent years, with the rapid development of portable electronic products, such as smart phones and tablet PCs, there is a growing demand for imaging lenses mounted on the portable electronic devices. On the one hand, people pursue the constant miniaturization and thinness of the portable electronic products. On the other hand, the imaging lenses mounted on the portable electronic devices are required to have high imaging quality in dark environments. This requires the matching optical imaging lens to meet the requirements of both miniaturization and high imaging quality in dark environments. In addition, the traditional imaging lens with a small number of lenses is difficult to achieve a characteristic of large image surface, and cannot better meet the current people's requirements for daily shooting.

SUMMARY

Some embodiments of the disclosure provides an optical imaging lens which may be applied to portable electronic products, and may at least solve or partially solve at least one of the above shortcomings in a related art.

One aspect of the disclosure provides such an optical imaging lens, which sequentially includes, from an object side to an image side along an optical axis, a first lens with refractive power, a second lens with positive refractive power, a third lens with negative refractive power, a fourth lens with refractive power, a fifth lens with refractive power, a sixth lens with refractive power, a seventh lens with positive refractive power and an eighth lens with negative refractive power.

In an exemplary embodiment, a total effective focal length f of the optical imaging lens and the maximum Field of View (FOV) of the optical imaging lens meet f×TAN(FOV/2)>4.0 mm.

In an exemplary embodiment, a total effective focal length f of the optical imaging lens, a center thickness CT7 of the seventh lens on the optical axis and a center thickness CT8 of the eighth lens on the optical axis meet f/(CT7+CT8)≥5.0.

In an exemplary embodiment, a distance TTL from an object-side surface of the first lens to an imaging surface of the optical imaging lens on the optical axis and an Entrance Pupil Diameter (EPD) of the optical imaging lens meet TTL/EPD≤2.0.

In an exemplary embodiment, a total effective focal length f of the optical imaging lens and a curvature radius R2 of an image-side surface of the first lens meet f/R2>1.5.

In an exemplary embodiment, a total effective focal length f of the optical imaging lens and a curvature radius R10 of an image-side surface of the fifth lens meet f/R10<−0.5.

In an exemplary embodiment, a curvature radius R3 of an object-side surface of the second lens and a curvature radius R4 of an image-side surface of the second lens meet −10<R4/R3<−3.0.

In an exemplary embodiment, a total effective focal length f of the optical imaging lens, a curvature radius R13 of an object-side surface of the seventh lens and a curvature radius R14 of an image-side surface of the seventh lens meet f/R13+f/R14>3.5.

In an exemplary embodiment, a curvature radius R15 of an object-side surface of the eighth lens and a curvature radius R16 of an image-side surface of the eighth lens meet 1<R15/R16<2.

In an exemplary embodiment, a total effective focal length f of the optical imaging lens, a effective focal length f3 of the third lens, and an effective focal length f8 of the eighth lens meet |f/f3−f/f8|<0.5.

In an exemplary embodiment, an effective focal length f5 of the fifth lens and an effective focal length f4 of the fourth lens meet −5.0<f5/f4<0.

In an embodiment, an effective focal length f7 of the seventh lens and a combined focal length f12 of the first lens and the second lens meet 1.5<f7/f12<5.0.

In an exemplary embodiment, a total effective focal length f of the optical imaging lens and an effective focal length f1 of the first lens meet f/|f1|≤0.3.

In an exemplary embodiment, an abbe number V4 of the fourth lens, an abbe number V5 of the fifth lens and an abbe number V6 of the sixth lens meet 30<(V4+V5+V6)/3<40.

In an exemplary embodiment, a total effective focal length f of the optical imaging lens and an EPD of the optical imaging lens meet f/EPD≤1.5.

The optical imaging lens provided by the disclosure includes multiple lenses, for example, the first lens to the eighth lens. By reasonably setting an interrelationship between a total effective focal length of the optical imaging lens and the maximum FOV of the optical imaging lens, and optimizing the refractive power and surface type of each lens, and combining them reasonably, the optical imaging lens may have a larger imaging, surface when it is miniaturized and light and thin.

BRIEF DESCRIPTION OF THE DRAWINGS

Detailed descriptions are made to unrestrictive implementation modes below in combination with the accompanying drawings to make the other characteristics, purposes and advantages of the disclosure more apparent. In the accompanying drawings.

DETAILED DESCRIPTION OF THE EMBODIMENTS

Figure 1:
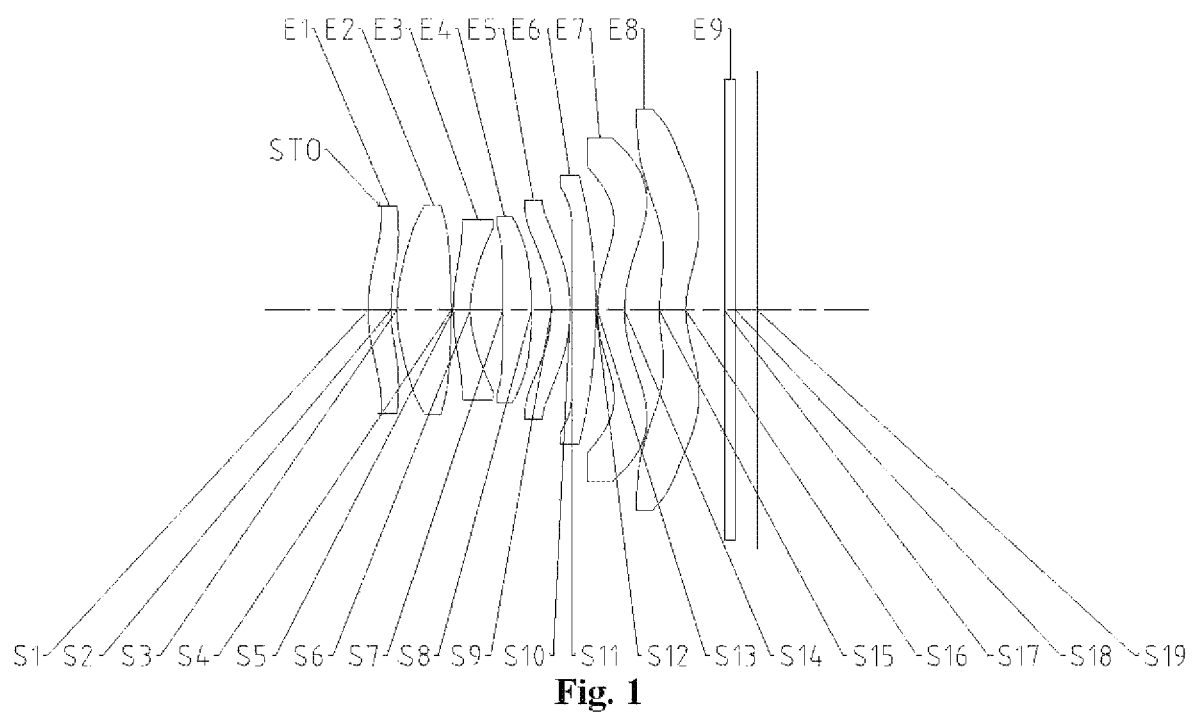
FIG. 1 is a schematic structural view of an optical imaging lens according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure", Furthermore, term "exemplary" refers to an example or exemplary description.

Unless otherwise defined, all terms (including technical terms and scientific terms) used in the disclosure have the same meanings usually understood by the general technical personnel in the field of the disclosure. It also should be understood that the terms (for example, terms defined in a common dictionary) should be explained to have meanings consistent with the meanings in the context of correlation technique and can not be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

An optical imaging lens according to an exemplary implementation mode of the disclosure may include eight lenses with refractive power, i.e., a first lens, a second lens, a third lens, a fourth lens, a fifth lens, a sixth lens, a seventh lens and an eighth lens. The eight lenses are sequentially arranged from an object side to an image side along an optical axis. The adjacent lenses may have air space between them.

In an exemplary implementation mode, the first lens may have the positive refractive power or the negative refractive power, an object-side surface thereof is a convex surface, and an image-side surface is a concave surface. The second lens may have the positive refractive power, an object-side surface thereof is a convex surface, and an image-side surface is a convex surface. The third lens has the negative refractive power, an object-side surface thereof is a concave surface. The fourth lens has the positive refractive power or the negative refractive power. The fifth lens has the positive refractive power, and an image-side surface thereof is a convex surface. The sixth lens has the positive refractive power or the negative refractive power, and an image-side surface thereof is a convex surface. The seventh lens may have the positive refractive power, an object-side surface thereof is a convex surface, and an image-side surface is a concave surface. The eighth lens may have the negative refractive power, an object-side surface thereof is a convex surface, and an image-side surface is, a concave surface. The reasonable combination of the refractive power and the surface type of each lens in the optical system may effectively balance aberration of the optical system and improve the imaging quality.

In an exemplary implementation mode, a total effective focal length f of the optical imaging lens and the maximum FOV of the optical imaging lens meet f×TAN(FOV/2)>4.0 mm, for example, 4.0 mm<f×TAN(FOV/2)<6.5 mm. Reasonably setting an interrelationship between a total effective focal length of the optical imaging lens and the maximum FOV of the optical imaging lens is conductive to the optical system having a larger imaging surface.

In an exemplary implementation mode, a total effective focal length f of the optical imaging lens, a center thickness CT7 of the seventh lens on an optical axis and a center thickness CT8 of the eighth lens on an optical axis meet f/(CT7+CT8)≥5.0, for example, 5.0≤f/(CT7+CT8)≤7.0. Reasonably setting a ratio relationship between the CT of the seventh lens and the eighth lens and a total effective focal length of the optical imaging lens and the sum of the CTs of the seventh lens and the eighth lens is conductive to balancing the distribution of refractive power of the optical imaging lens, so that the optical imaging lens has the features of miniaturization and larger imaging surface.

In an exemplary implementation mode, a distance TTL from an object-side surface of the first lens to the imaging surface of the optical imaging lens on an optical axis and an EPD of the optical imaging lens meet TTL/EPD≤2.0, for example, 1.0≤TTL/EPD≤2.0. Reasonably setting a ratio relationship between a distance from an object-side surface of the first lens to an imaging surface of the optical imaging lens on an optical axis and an EPD of the optical imaging lens and effectively reducing a total length of the optical system is conductive to realizing the miniaturization of the optical system and facilitating the optical imaging lens to be better applicable to more and more portable electronic products on the market. At the same time, increasing an EPD of the optical system may improve light flux and relative illumination of the optical system and improve the imaging quality of the optical system in dark light.

In an exemplary implementation mode, a total effective focal length f of the optical imaging lens and a curvature radius R2 of an image-side surface of the first lens meet f/R2>1.5, for example, 1.5<f/R2≤2.0. Reasonably setting a ratio relationship between a total effective focal length of the optical imaging lens and a curvature radius of an image-side surface of the first lens and effectively controlling, a curvature radius of an image-side surface of the first lens are conductive to controlling a field curvature contribution of the first lens in a reasonable range to balance a field curvature contribution generated by the back group of lenses.

In an exemplary implementation mode, a total effective focal length f of the optical imaging lens and a curvature radius R10 of an image-side surface of the fifth lens meet f/R10<−0.5, for example, −2.0<f/R10<−0.5. Reasonably setting a ratio relationship between a total effective focal length of the optical imaging lens and a curvature radius of an image-side surface of the fifth lens is conductive to reducing longitudinal aberration of the optical system and improving the imaging quality of the optical system.

In an exemplary implementation mode, a curvature radius R3 of an object-side surface of the second lens and a curvature radius R4 of an image-side surface of the second lens meet −10<R4/R3<−3.0, for example, −7<R4/R3<−3. Setting a ratio between a curvature radius of an object-side surface of the second lens and a curvature radius of an image-side surface of the second lens in a reasonable numerical range and effectively controlling the lens shape of the second lens is conductive to reducing an aberration contribution rate of the second lens and balancing the aberration related to an aperture belt in the optical system, thus improving the imaging quality of the optical system.

In an exemplary implementation mode, a total effective focal length f of the optical imaging lens, a curvature radius R13 of an object-side surface of the seventh lens and a curvature radius R14 of an image-side surface of the seventh lens meet f/R13+f/R14>3.5, for example, 3.5<f/R13+f/R14<6.0. Reasonably setting an interrelationship among a total effective focal length of the optical imaging lens, a curvature radius of an object-side surface of the seventh lens and a curvature radius of an image-side surface of the seventh lens, and effectively controlling the curvature radii of an object-side surface and an image-side surface of the seventh lens is conductive to reducing the contribution rate of third-order astigmatism of the seventh lens and controlling the generated third-order astigmatism within a reasonable range, so that the lens has high efficiency performance at different distances.

In an exemplary implementation mode, a curvature radius R15 of an object-side surface of the eighth lens and a curvature radius R16 of an image-side surface of the eighth lens meet 1<R15/R16<2. Reasonably setting a ratio relationship between a curvature radius of an object-side surface of the eighth lens and a curvature radius of an image-side surface of the eighth lens and effectively controlling the lens shape of the eighth lens are conductive to reducing an angle of chief ray entering the optical system, which facilitates better match with a chip and reduces an optical distortion of the system.

In an exemplary implementation mode, a total effective focal length f of the optical imaging lens, a effective focal length f3 of the third lens, and a effective focal length f8 of the eighth lens meet |f/f3−f/f8|<0.5. Reasonably setting an interrelationship among a total effective focal length of the optical imaging lens, a effective focal length of the third lens and a effective focal length of the eighth lens and effectively controlling a reasonable distribution of the refractive power of the optical imaging lens to avoid the refractive power from excessively concentrating on the second lens and the seventh lens are not only conductive to improving the imaging quality of the optical system and reducing the system sensitivity, but also conductive to realizing the miniaturization of the lens.

In an exemplary implementation mode, an effective focal length f5 of the fifth lens and an effective focal length f4 of the fourth lens meet −5.0<f5/f4<0. Reasonably setting a ratio relationship between an effective focal length of the fifth lens and an effective focal length of the fourth lens is not only conductive to reducing the size of the optical system and realizing the miniaturization of the optical system, but also conducive to a reasonable distribution of the refractive power of the system to avoid the excessive concentration of the refractive power. At the same time, the fifth lens and the fourth lens are matched with the first three lenses to better correct the aberration of the optical system.

In an exemplary implementation mode, an effective focal length f7 of the seventh lens and a combined focal length f12 of the first lens and the second lens meet 1.5<f7/f12<5.0. Reasonably setting a ratio relationship between an effective focal length of the seventh lens and a combined focal length of the first lens and the second lens is not only conductive to reducing the sensitivity of the front group of lenses to avoid a strict tolerance requirement, but also conductive to eliminating the astigmatism and coma caused by the front group of lenses, thus improving the imaging quality of the optical system and making it have better resolution.

In an exemplary implementation mode, a total effective focal length f of the optical imaging lens and an effective focal length f1 of the first lens meet f/|f1|≤0.3. Reasonably setting a ratio relationship between a total effective focal length of the optical imaging lens and an effective focal length of the first lens is not only conductive to reducing the deflection of light in the first lens and reducing the sensitivity of the first lens, but also conductive to reducing a spherical aberration generated by the first lens.

In an exemplary implementation mode, an abbe number V4 of the fourth lens, an abbe number V5 of the fifth lens and an abbe number V6 of the sixth lens meet 30<(V4+V5+V6)/3<40. Setting an average abbe number of the three lenses in a reasonable numerical range is conductive to reducing chromatic dispersion of the optical system.

In an exemplary implementation mode, a total effective focal length f of the optical imaging lens and an EPD of the optical imaging lens meet f/EPD≤1.5, for example, 1.0<f/EPD≤1.5. Reasonably setting a ratio relationship between a total effective focal length of the optical imaging lens and an EPD of the optical imaging lens is beneficial for the optical system to have a smaller F number and large aperture while having a large image surface, so that the optical system may also have good imaging quality in dark environments.

In an exemplary implementation mode, the above optical imaging lens may further include a diaphragm. The diaphragm may be set in place as needed. For example, the diaphragm may be arranged between an object side and the first lens. Optionally, the above optical imaging lens may further include an optical filter configured to correct the chromatic aberration and/or protective glass configured to protect a photosensitive element on the imaging surface.

The optical imaging lens according to the above implementation modes of the disclosure may adopt multiple lenses, for example, the above eight lenses. Each lens can be reasonably configured to improve a light convergence capability of the lens, enhance the resolution and contrast of the lens, and improve the glare phenomena of the lens in dark environments. In the disclosure, the optical imaging lens with a large aperture easily obtains an effect of small depth of field, bokeh and high shutter speed when shooting in low light environments.

In an exemplary implementation mode, at least one of mirror surfaces of each lens is an aspherical mirror surface, that is, at least one from an object-side surface of the first lens to an image-side surface of the eighth lens is an aspherical mirror surface. The aspherical mirror surface, has the features that the curvature is constantly changing from a center of the lens to a periphery of the lens. Unlike a spherical lens with a constant curvature from a center of the lens to a periphery of the lens, an aspherical lens has a better curvature radius characteristic and the advantages of improving distortion aberrations and improving astigmatic aberrations. With adoption of the aspherical lens, the aberrations during imaging may be eliminated as much as possible, thereby improving the imaging quality. Optionally, at least one of an object-side surface and an image-side surface of each of the first lens, the second lens, the third lens, the fourth lens, the fifth lens, the sixth lens, the seventh lens and the eighth lens is the aspherical mirror surface. Optionally, both an object-side surface and an image-side surface of each of the first lens, the second lens, the third lens, the fourth lens, the fifth lens, the sixth lens, the seventh lens and the eighth lens are the aspherical mirror surface.

The disclosure also provides an imaging device an electronic photosensitive element of which may be a Charge Coupled Device (CCD) or a Complementary Metal Oxide Semiconductor (CMOS). The imaging device may be an independent imaging device like a digital camera or an imaging module integrated into a mobile electronic device like a mobile phone. The imaging device is equipped with the optical imaging lens described above.

An exemplary implementation mode of the disclosure also provides an electronic device, which includes the imaging device described above.

However, those skilled in the art should know that the number of the lenses forming the optical imaging lens may be changed without departing from the technical solutions claimed in the disclosure to achieve each result and advantage described in the description. For example, although descriptions are made in the implementation mode with eight lenses as an example, the optical imaging lens is not limited to eight lenses. If necessary, the optical imaging lens may further include another number of lenses.

Specific embodiments of the optical imaging lens applied to the abovementioned implementation mode will further be described below with reference to the drawings.

Embodiment 1

The optical imaging lens according to embodiment 1 of the disclosure will be described below with reference to FIG. 1 to FIG. 2D. FIG. 1 shows a schematic structural view of an optical imaging lens according to embodiment 1 of the disclosure.

As shown in FIG. 1, an optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7, an eighth lens E8, a filter E9 and an imaging surface S19.

The first lens E1 has the negative refractive power, an object-side surface S1 thereof is a convex surface, and an image-side surface S2 is a concave surface. The second lens E2 has the positive refractive power, an object-side surface S3 thereof is a convex surface, and an image-side surface S4 is a convex surface. The third lens E3 has the negative refractive power, an object-side surface S5 thereof is a convex surface, and an image-side surface S6 is a concave surface. The fourth lens E4 has the positive refractive power, an object-side surface S7 thereof is a convex surface, and an image-side surface S8 is a convex surface. The fifth lens E5 has the negative refractive power, an object-side surface S9 thereof is a concave surface, and an image-side surface S10 is a convex surface. The sixth lens E6 has the positive refractive power, an object-side surface S11 thereof is a convex surface, and an image-side surface S12 is a convex surface. The seventh lens E7 has the positive refractive power, an object-side surface S13 thereof is a convex surface, and an image-side surface S14 is a concave surface. The eighth lens E8 has the negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

Table 1 shows basic parameters of the optical imaging lens of embodiment 1, in which the units of curvature radius, thickness/distance and focal length are millimeter (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.2189 | | | | |
| S1 | Aspherical | 3.1512 | 0.4268 | 1.546 | 56.11 | −125.13 | −0.1877 |
| S2 | Aspherical | 2.8681 | 0.1151 | | | | −0.0607 |
| S3 | Aspherical | 2.9202 | 1.0227 | 1.546 | 56.11 | 4.41 | 0.0151 |
| S4 | Aspherical | −11.9609 | 0.0300 | | | | −13.2152 |
| S5 | Aspherical | 3.3248 | 0.3200 | 1.666 | 20.40 | −9.01 | 0.7508 |
| S6 | Aspherical | 2.0585 | 0.6129 | | | | −0.0204 |
| S7 | Aspherical | 446.2625 | 0.5368 | 1.546 | 56.11 | 14.47 | −49.0070 |
| S8 | Aspherical | −8.0372 | 0.3702 | | | | −12.2178 |
| S9 | Aspherical | −2.1822 | 0.3500 | 1.678 | 19.25 | −16.21 | −0.8724 |
| S10 | Aspherical | −2.8995 | 0.0300 | | | | 0.1461 |
| S11 | Aspherical | 1111.1444 | 0.4500 | 1.570 | 37.32 | 17.83 | −90.3244 |
| S12 | Aspherical | −10.2649 | 0.0300 | | | | 0.0896 |
| S13 | Aspherical | 2.4399 | 0.5064 | 1.546 | 56.11 | 22.12 | −4.2469 |
| S14 | Aspherical | 2.8336 | 0.6485 | | | | −3.0684 |
| S15 | Aspherical | 2.6854 | 0.4932 | 1.536 | 55.74 | −10.46 | −13.3603 |
| S16 | Aspherical | 1.6999 | 0.7296 | | | | −4.6706 |
| S17 | Spherical | Infinite | 0.2100 | 1.517 | 64.17 | | |
| S18 | Spherical | Infinite | 0.4000 | | | | |
| S19 | Spherical | Infinite | | | | | |

In the embodiment, the total effective focal length f of the optical imaging lens is 5.47 mm, the distance TTL from the object-side surface S1 of the first lens E1 to the imaging surface S19 on the optical axis is 7.28 mm, and the maximum FOV of the optical imaging lens is 77.6 degrees.

In embodiment 1, both an object-side surface and an image-side surface of any lens in the first lens E1 to the eighth lens E8 are aspherical surfaces, and the surface type x of each aspherical lens can be defined by use of, but not limited to, the following aspherical surface formula:

$$x = \frac{ch^2}{1 + \sqrt{1-(k+1)c^2h^2}} + \sum A_i h^i, \quad (1)$$

wherein, x is the distance rise between a position of the aspherical surface at a height h along the optical axis and the aspherical surface vertex; c is the paraxial curvature of the aspherical surface, c=1/R (namely, the paraxial curvature c is a reciprocal of the curvature radius R in Table 1); k is the conic coefficient; and Ai is the i-th-order correction coefficient of the aspherical surface. Table 2 shows the higher-order coefficients A4, A6, A8, A10, A12, A14, A16, A18 and A20 applicable to the aspherical mirror surfaces S1-S16 in embodiment 1.

TABLE 2

| Surface number | A4 | A6 | A8 | A10 | A12 |
|---|---|---|---|---|---|
| S1 | −2.0246E−02 | −2.4977E−03 | −2.4464E−03 | 3.9406E−03 | −3.5543E−03 |
| S2 | −4.6466E−02 | −1.6508E−02 | 8.4087E−04 | 9.0566E−03 | −5.9915E−03 |
| S3 | −1.7542E−02 | −1.3592E−02 | −9.8924E−04 | 7.8563E−03 | −3.3753E−03 |
| S4 | 1.4705E−02 | −5.2619E−03 | −1.1523E−02 | 1.5069E−02 | −9.2367E−03 |
| S5 | −5.5062E−02 | 3.0799E−02 | −4.1126E−02 | 3.9846E−02 | −2.5657E−02 |
| S6 | −7.5889E−02 | 4.4674E−02 | −4.5135E−02 | 4.0547E−02 | −2.7859E−02 |
| S7 | −1.4028E−02 | 6.7594E−05 | 4.3718E−03 | −1.3998E−02 | 1.7151E−02 |
| S8 | −1.9571E−02 | −4.5538E−03 | 1.2664E−02 | −2.2059E−02 | 2.0155E−02 |
| S9 | 2.6723E−02 | −5.8393E−03 | −1.1082E−03 | 6.6956E−03 | −6.9742E−03 |
| S10 | 7.1194E−03 | 1.4022E−03 | 2.5078E−03 | −1.8493E−03 | 8.0432E−04 |
| S11 | 5.2175E−03 | −7.9540E−04 | −1.2714E−04 | −2.4000E−04 | 8.5785E−05 |
| S12 | 5.7061E−20 | −1.4959E−27 | −1.7030E−33 | 1.0161E−39 | −3.2244E−46 |
| S13 | 7.7939E−03 | −1.3517E−02 | 2.6977E−03 | −5.1965E−04 | −2.8291E−05 |
| S14 | 1.7346E−02 | −1.1523E−02 | −3.2441E−04 | 1.1702E−03 | −3.6060E−04 |
| S15 | −6.3528E−02 | 4.2239E−03 | 4.1777E−03 | −1.5394E−03 | 2.6963E−04 |
| S16 | −5.8748E−02 | 1.4103E−02 | −2.5931E−03 | 2.7812E−04 | −8.0935E−06 |

| Surface number | A14 | A16 | A18 | A20 |
|---|---|---|---|---|
| S1 | 1.7719E−03 | −4.8005E−04 | 6.7513E−05 | −3.8961E−06 |
| S2 | 1.9716E−03 | −3.8128E−04 | 4.2101E−05 | −2.0794E−06 |
| S3 | 4.0255E−04 | 6.3342E−05 | −2.0310E−05 | 1.4402E−06 |
| S4 | 3.2832E−03 | −6.8897E−04 | 7.9673E−05 | −3.9444E−06 |
| S5 | 1.0539E−02 | −2.6605E−03 | 3.8156E−04 | −2.4154E−05 |

TABLE 2-continued

| | | | | |
|---|---|---|---|---|
| S6 | 1.3106E−02 | −3.9502E−03 | 6.8890E−04 | −5.3126E−05 |
| S7 | −1.1783E−02 | 4.7369E−03 | −1.0458E−03 | 9.7787E−05 |
| S8 | −1.0906E−02 | 3.6259E−03 | −6.8452E−04 | 5.5644E−05 |
| S9 | 3.9625E−03 | −1.2336E−03 | 1.9607E−04 | −1.2493E−05 |
| S10 | −2.8666E−04 | 8.0320E−05 | −1.2750E−05 | 7.9530E−07 |
| S11 | −1.3709E−05 | 4.2305E−07 | 1.4671E−07 | −9.9254E−09 |
| S12 | 6.0316E−53 | −6.7718E−60 | 4.1905E−67 | −1.1155E−74 |
| S13 | 7.0539E−05 | −1.9279E−05 | 2.1547E−06 | −8.8896E−08 |
| S14 | 5.8113E−05 | −5.5195E−06 | 2.9329E−07 | −6.7208E−09 |
| S15 | −2.7585E−05 | 1.6736E−06 | −5.5855E−08 | 7.9101E−10 |
| S16 | −1.3523E−06 | 1.5558E−07 | −6.5516E−09 | 1.0358E−10 |

Figure 2A:
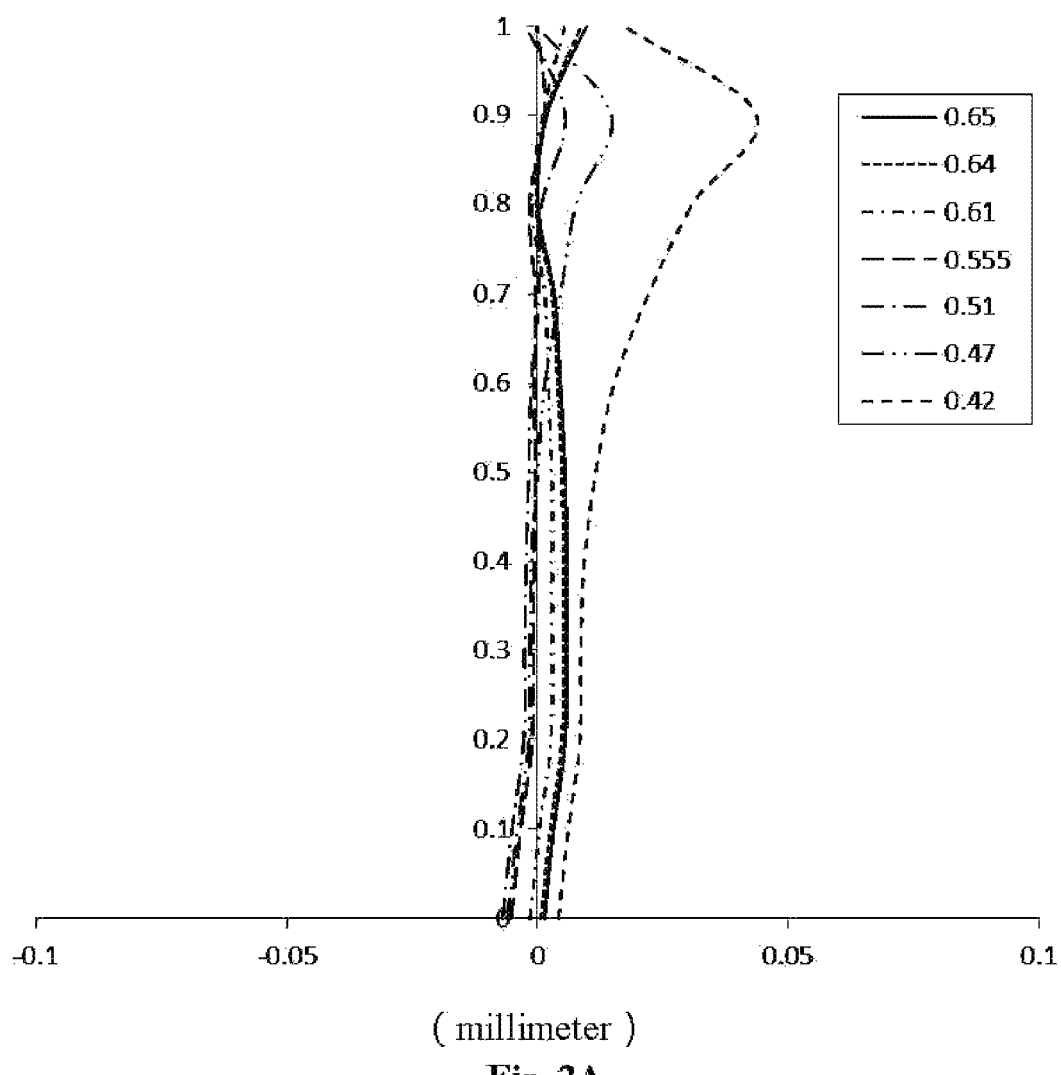
FIG. 2A to FIG. 2D shows a longitudinal aberration curve, astigmatism curve, distortion curve and lateral color curve of an optical imaging lens according to a first embodiment respectively.
Figure 2B:
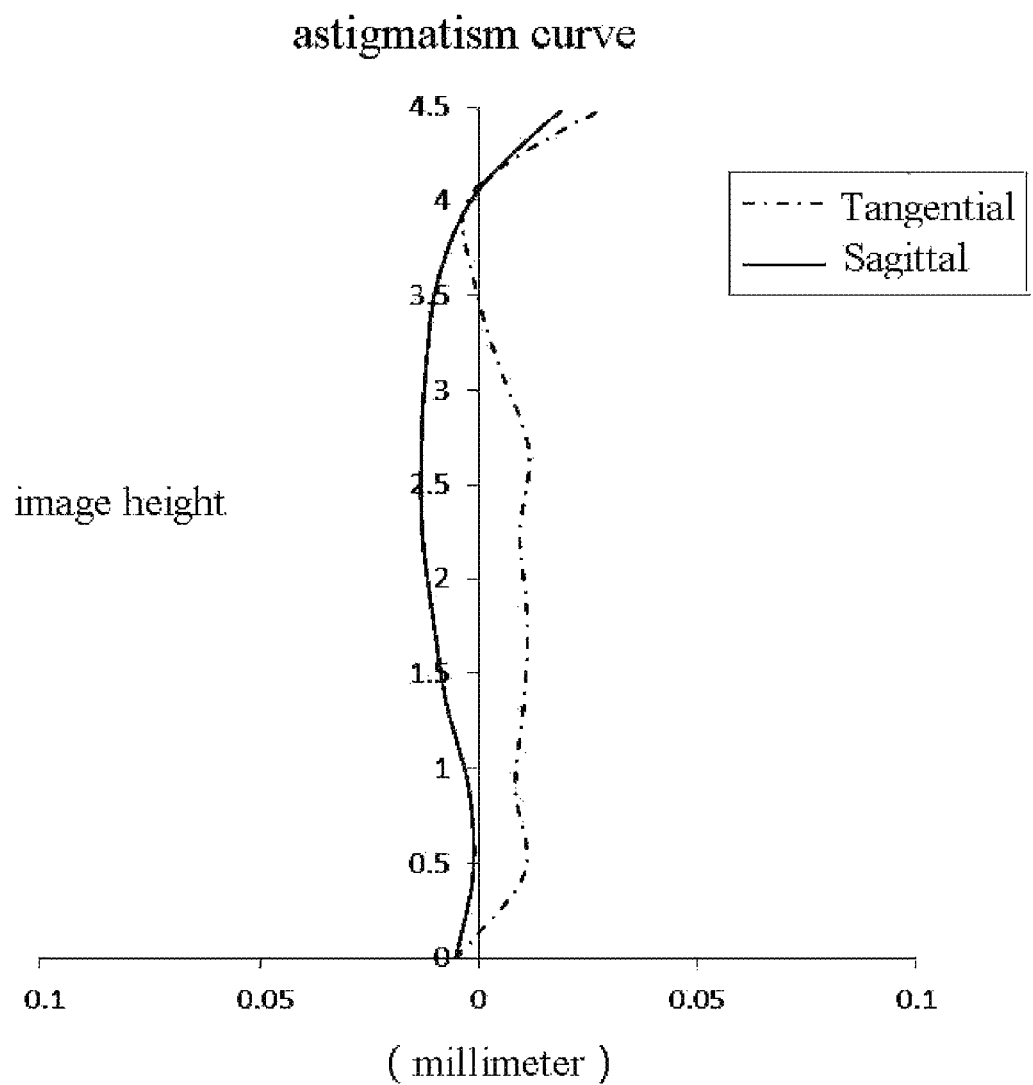
Figure 2C:
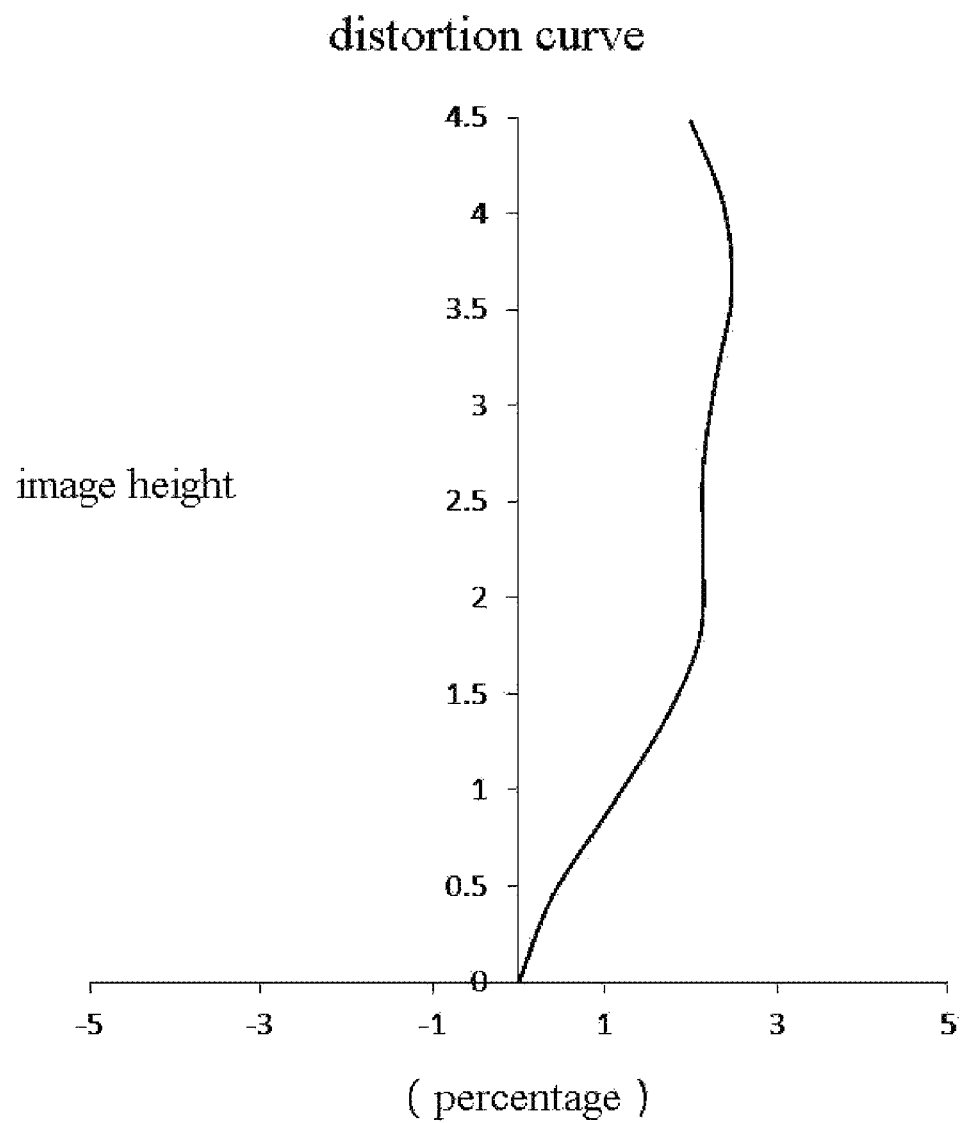
Figure 2D:
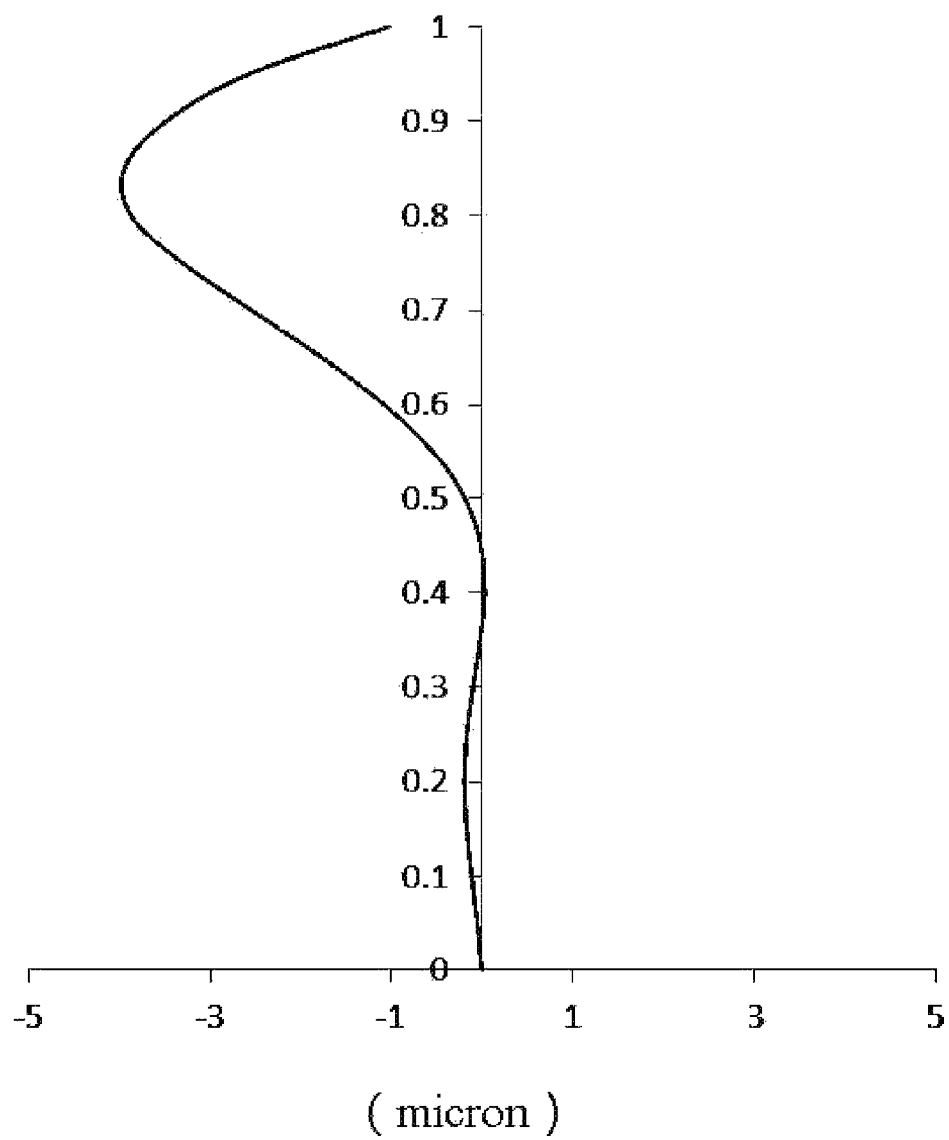

FIG. 2A shows a longitudinal aberration curve of the optical imaging lens according to embodiment 1 to represent deviation of a convergence focal point after light with different wavelengths passes through the lens. FIG. 2B shows an astigmatism curve of the optical imaging lens according to embodiment 1 to represent a tangential image surface curvature and a sagittal image surface curvature. FIG. 2C shows a distortion curve of the optical imaging lens according to embodiment 1 to represent distortion values corresponding to different image heights. FIG. 2D shows a lateral color curve of the optical imaging lens according, to embodiment 1 to represent deviation of different image heights on the imaging surface after the light passes through the lens. According to FIG. 2A to FIG. 2D, it can be seen that the optical imaging lens provided in embodiment 1 may achieve high imaging quality.

Embodiment 2

Figure 3:
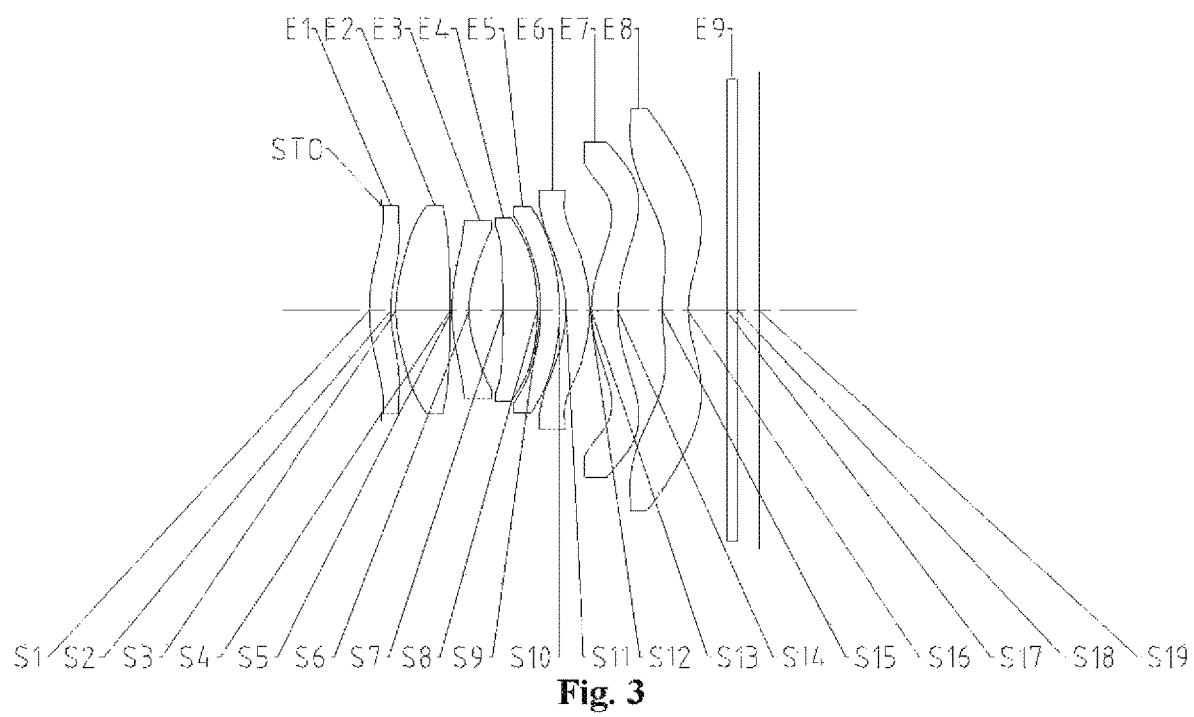
FIG. 3 is a schematic structural view of an optical imaging lens according to a second embodiment of the disclosure.

The optical imaging lens according to embodiment 2 of the disclosure will be described below with reference to FIG. 2 to FIG. 4D. FIG. 3 shows a schematic structural view of the optical imaging lens according to embodiment 2 of the disclosure;

As shown in FIG. 3, an optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7, an eighth lens E8, a filter E9 and an imaging surface S19.

The first lens E1 has the negative refractive power, an object-side surface S1 thereof is a convex surface, and an image-side surface S2 is a concave surface. The second lens E2 has the positive refractive power, an object-side surface S3 thereof is a convex surface, and an image-side surface S4 is a convex surface. The third lens E3 has the negative refractive power, an object-side surface S5 thereof is a convex surface, and an image-side surface S6 is a concave surface. The fourth lens E4 has the positive refractive power, an object-side surface S7 thereof is a concave surface, and an image-side surface S8 is a convex surface. The fifth lens E5 has the negative refractive power, an object-side surface S9 thereof is a concave surface, and an image-side surface S10 is a convex surface. The sixth lens E6 has the negative refractive power, an object-side surface S11 thereof is a concave surface, and an image-side surface S12 is a convex surface. The seventh lens E7 has the positive refractive power, an object-side surface S13 thereof is a convex surface, and an image-side surface S14 is a concave surface. The eighth lens E8 has the negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

In the embodiment, the total effective focal length f of the optical imaging lens is 5.47 mm, the distance TTL from the object-side surface S1 of the first lens E1 to the imaging surface S19 on the optical axis is 7.28 mm, and the maximum FOV of the optical imaging lens is 77.8 degrees.

Table 3 shows basic parameters of the optical imaging lens of embodiment 2, in which the units of curvature radius, thickness/distance and focal length are millimeter (mm).

TABLE 3

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.2261 | | | | |
| S1 | Aspherical | 3.1388 | 0.4000 | 1.546 | 56.11 | −58.73 | 0.2109 |
| S2 | Aspherical | 2.7302 | 0.0937 | | | | −6.7242 |
| S3 | Aspherical | 2.7152 | 1.0133 | 1.546 | 56.11 | 4.36 | 0.1244 |
| S4 | Aspherical | −16.6244 | 0.0300 | | | | 0.9950 |
| S5 | Aspherical | 3.0821 | 0.3200 | 1.666 | 20.40 | −10.45 | 0.2977 |
| S6 | Aspherical | 2.0485 | 0.6303 | | | | 0.0102 |
| S7 | Aspherical | −223.4926 | 0.6426 | 1.546 | 56.11 | 8.49 | −9.0486 |
| S8 | Aspherical | −4.5424 | 0.0645 | | | | −0.0063 |
| S9 | Aspherical | −3.3888 | 0.3500 | 1.678 | 19.25 | −37.13 | −0.0019 |
| S10 | Aspherical | −4.0797 | 0.1242 | | | | 0.1240 |
| S11 | Aspherical | −1.9558 | 0.4500 | 1.640 | 23.84 | −15.38 | −1.0000 |
| S12 | Aspherical | −2.6597 | 0.0300 | | | | 0.1127 |
| S13 | Aspherical | 2.1149 | 0.4981 | 1.546 | 56.11 | 10.33 | −0.9946 |
| S14 | Aspherical | 3.1027 | 0.8230 | | | | −1.0000 |
| S15 | Aspherical | 3.0728 | 0.4859 | 1.536 | 55.74 | −9.04 | −0.7452 |
| S16 | Aspherical | 1.7775 | 0.7172 | | | | −1.0000 |

TABLE 3-continued

| Surface number | Surface type | Curvature radius | Thickness/ distance | Material Refractive index | Abbe number | Focal length | Conic coefficient |
|---|---|---|---|---|---|---|---|
| S17 | Spherical | Infinite | 0.2100 | 1.517 | 64.17 | | |
| S18 | Spherical | Infinite | 0.4000 | | | | |
| S19 | Spherical | Infinite | | | | | |

In embodiment 2, both an object-side surface and an image-side surface of any lens in the first lens E1 to the eighth lens E8 are aspheric surfaces. Table 4 shows the higher-order coefficients A4, A6, A8, A10, A12, A14, A16, A18 and A20 applicable to the aspherical mirror surfaces S1-S16 in embodiment 2.

TABLE 4

| Surface number | A4 | A6 | A8 | A10 | A12 |
|---|---|---|---|---|---|
| S1 | −2.2690E−02 | −1.4233E−03 | −3.7467E−03 | 4.9532E−03 | −4.1602E−03 |
| S2 | −1.0539E−02 | −2.9840E−02 | 3.1055E−03 | 1.5116E−02 | −1.1941E−02 |
| S3 | −2.2063E−02 | −1.3955E−02 | −6.2462E−03 | 1.8324E−02 | −1.1328E−02 |
| S4 | 1.7903E−02 | −1.4951E−02 | 1.2428E−03 | 5.3690E−03 | −4.3446E−03 |
| S5 | −4.5020E−02 | 1.6679E−02 | −2.8070E−02 | 3.3059E−02 | −2.4153E−02 |
| S6 | −6.8137E−02 | 3.7666E−02 | −4.3678E−02 | 4.3316E−02 | −3.1189E−02 |
| S7 | −1.7977E−02 | 8.5170E−03 | −1.1051E−02 | 1.2861E−03 | 8.7138E−03 |
| S8 | −2.4651E−03 | −1.4993E−02 | −6.1547E−02 | 1.6243E−01 | −1.7100E−01 |
| S9 | 2.7238E−02 | −6.9263E−02 | 1.6195E−02 | 1.0536E−01 | −1.4707E−01 |
| S10 | 3.2309E−02 | −8.3149E−02 | 7.1051E−02 | −1.9428E−02 | −6.4827E−03 |
| S11 | 1.1381E−01 | −1.1337E−01 | 6.6662E−02 | −1.1103E−02 | −8.5701E−03 |
| S12 | 3.6572E−02 | −3.1398E−02 | 2.4086E−02 | −1.1222E−02 | 2.9497E−03 |
| S13 | −3.5552E−02 | 4.5901E−03 | −3.1854E−03 | 4.0059E−04 | 2.0033E−04 |
| S14 | 1.2680E−02 | −1.1458E−02 | −1.2454E−03 | 1.7891E−03 | −5.6033E−04 |
| S15 | −1.2508E−01 | 3.3801E−02 | −8.5228E−03 | 1.9803E−03 | −3.2472E−04 |
| S16 | −1.3296E−01 | 4.3031E−02 | −1.2102E−02 | 2.5069E−03 | −3.5767E−04 |

| Surface number | A14 | A16 | A18 | A20 |
|---|---|---|---|---|
| S1 | 2.0379E−03 | −5.5278E−04 | 7.8091E−05 | −4.5211E−06 |
| S2 | 4.6019E−03 | −1.0205E−03 | 1.2480E−04 | −6.5477E−06 |
| S3 | 3.6390E−03 | −6.9179E−04 | 7.5844E−05 | −3.8070E−06 |
| S4 | 1.6623E−03 | −3.4999E−04 | 3.8852E−05 | −1.7991E−06 |
| S5 | 1.0946E−02 | −3.0201E−03 | 4.6835E−04 | −3.1480E−05 |
| S6 | 1.4892E−02 | −4.4729E−03 | 7.6794E−04 | −5.8134E−05 |
| S7 | −9.8551E−03 | 4.9881E−03 | −1.2525E−03 | 1.2609E−04 |
| S8 | 9.6181E−02 | −3.0257E−02 | 5.0187E−03 | −3.4167E−04 |
| S9 | 9.1130E−02 | −3.0272E−02 | 5.2485E−03 | −3.7399E−04 |
| S10 | 6.0497E−03 | −1.7688E−03 | 2.4303E−04 | −1.3254E−05 |
| S11 | 5.9180E−03 | −1.6073E−03 | 2.1091E−04 | −1.1019E−05 |
| S12 | −1.7821E−04 | −8.6740E−05 | 1.8653E−05 | −1.1128E−06 |
| S13 | −8.2601E−05 | 1.2381E−05 | −8.1248E−07 | 1.8437E−08 |
| S14 | 9.4785E−05 | −9.4114E−06 | 5.1511E−07 | −1.1961E−08 |
| S15 | 3.3718E−05 | −2.1131E−06 | 7.3228E−08 | −1.0815E−09 |
| S16 | 3.3967E−05 | −2.0398E−06 | 6.9693E−08 | −1.0273E−09 |

Figure 4A:
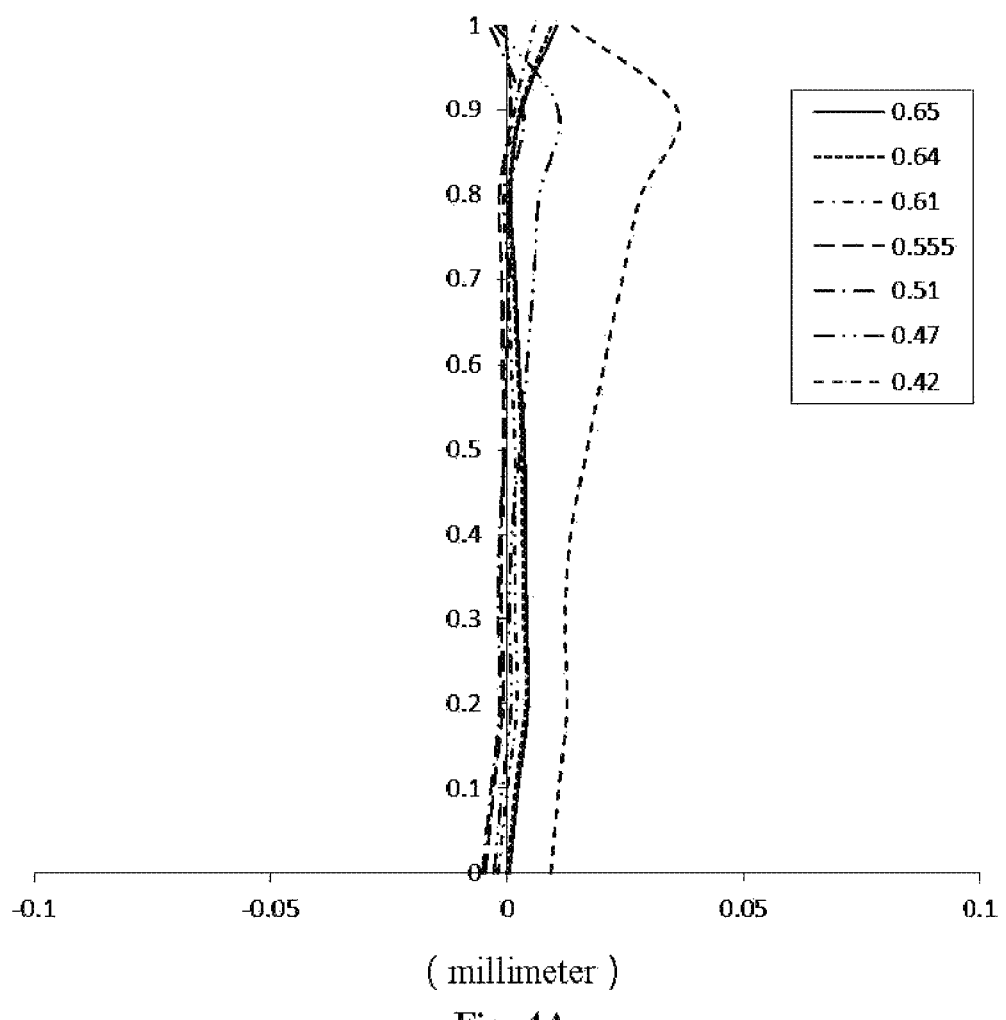
FIG. 4A to FIG. 4D shows a longitudinal aberration curve, astigmatism curve, distortion curve and lateral color curve of an optical imaging lens according to a second embodiment respectively.
Figure 4B:
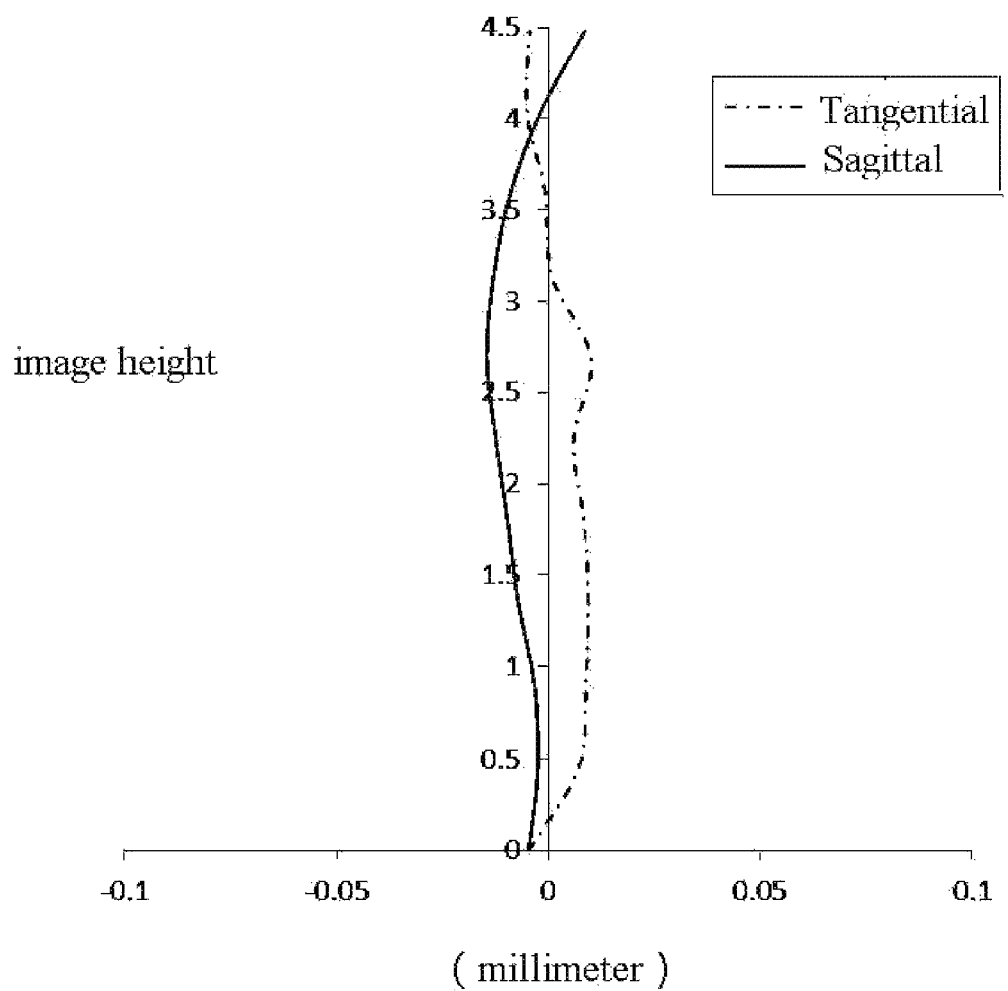
Figure 4C:
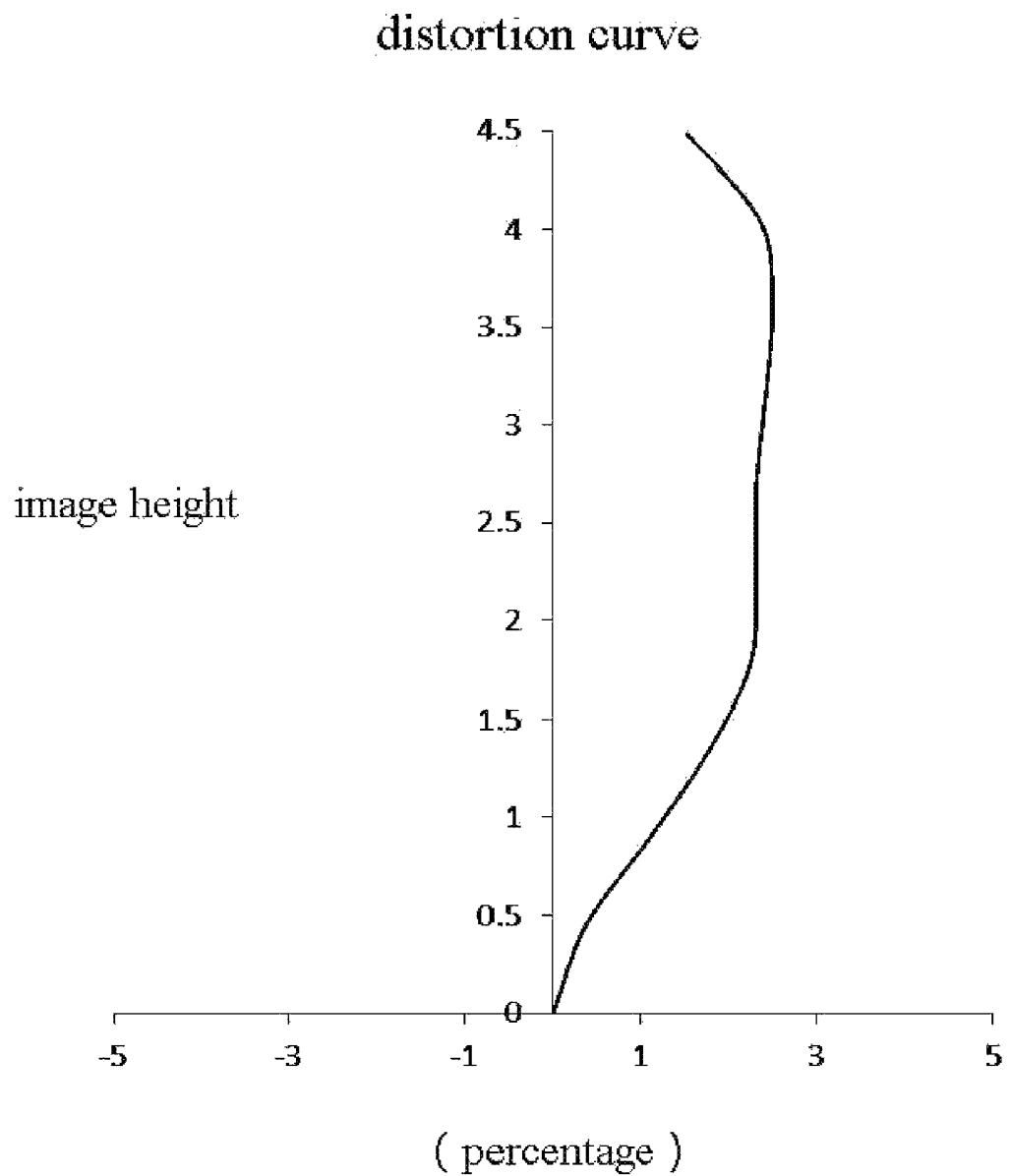
Figure 4D:
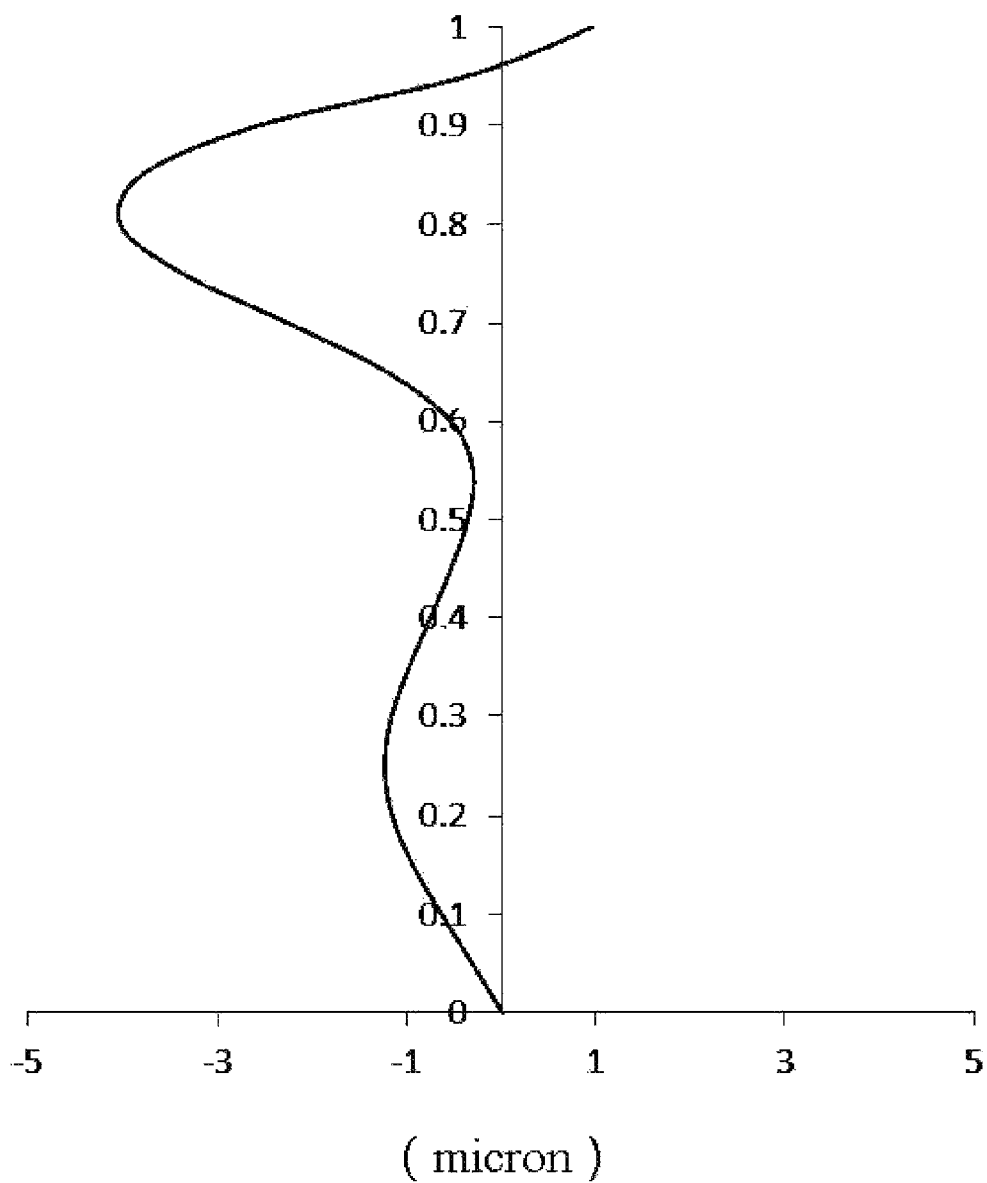

FIG. 4A shows a longitudinal aberration curve of the optical imaging lens according to embodiment 2 to represent deviation of a convergence focal point after light with different, wavelengths passes through the lens. FIG. 4B shows an astigmatism curve of the optical imaging lens according to embodiment 2 to represent a tangential image surface curvature and a sagittal image surface curvature. FIG. 4C shows a distortion curve of the optical imaging lens according to embodiment 2 to represent distortion values corresponding to different image heights. FIG. 4D shows a lateral color curve of the optical imaging lens according to embodiment 2 to represent deviation of different image heights on the imaging surface after the light passes through the lens. According to FIG. 4A to FIG. 4D, it can be seen that the optical imaging lens provided in embodiment 2 may achieve high imaging quality.

Embodiment 3

Figure 5:
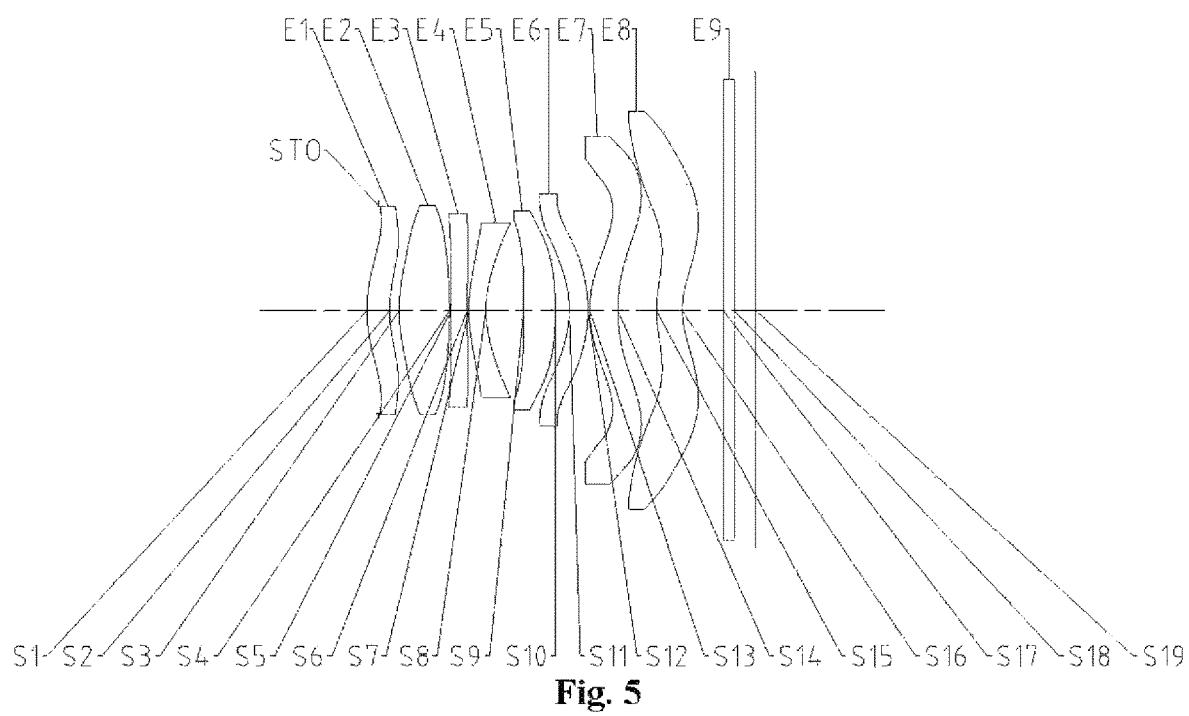
FIG. 5 is a schematic structural view of an optical imaging lens according to a third embodiment of the disclosure.

The optical imaging lens according to embodiment 3 of the disclosure will be described below with reference to FIG. 5 to FIG. 6D. FIG. 5 shows a schematic structural view of the optical imaging lens according to embodiment 3 of the disclosure;

As shown in FIG. 5, an optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7, an eighth lens E8, a filter E9 and an imaging surface S19.

The first lens E1 has the positive refractive power, an object-side surface S1 thereof is a convex surface, and an image-side surface S2 is a concave surface. The second lens E2 has the positive refractive power, an object-side surface S3 thereof is a convex surface, and an image-side surface S4 is a convex surface. The third lens E3 has the negative refractive power, an object-side surface S5 thereof is a concave surface, and an image-side surface S6 is a concave surface. The fourth lens E4 has the negative refractive power, an object-side surface S7 thereof is a convex surface, and an image-side surface S8 is a concave surface. The fifth lens E5 has the positive refractive power, an object-side surface S9 thereof is a concave surface, and an image-side surface S10 is a convex, surface. The sixth lens E6 has the negative refractive power, an object-side surface S11 thereof is a concave surface, and an image-side surface S12 is a convex surface. The seventh lens E7 has the positive refractive power, an object-side surface S13 thereof is a convex surface, and an image-side surface S14 is a concave surface. The eighth lens E8 has the negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

In the embodiment, the total effective focal length f of the optical imaging lens is 5.47 mm, the distance TTL from the object-side surface S1 of the first lens E1 to the imaging surface S19 on the optical axis is 7.28 mm, and the maximum FOV of the optical imaging lens is 77.7 degrees.

Table 5 shows basic parameters of the optical imaging lens of embodiment 3, in which the units of curvature radius, thickness/distance and focal length are millimeter (mm).

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.2184 | | | | |
| S1 | Aspherical | 2.9175 | 0.4273 | 1.546 | 56.11 | 411.49 | −0.4033 |
| S2 | Aspherical | 2.8030 | 0.1751 | | | | −0.1600 |
| S3 | Aspherical | 3.3308 | 0.9447 | 1.546 | 56.11 | 4.76 | −0.0403 |
| S4 | Aspherical | −10.5914 | 0.0300 | | | | 4.1185 |
| S5 | Aspherical | −45.7108 | 0.3000 | 1.678 | 19.25 | −37.26 | 53.5828 |
| S6 | Aspherical | 56.5576 | 0.0300 | | | | −99.0000 |
| S7 | Aspherical | 3.0542 | 0.3200 | 1.678 | 19.25 | −14.06 | 0.8063 |
| S8 | Aspherical | 2.2149 | 0.7084 | | | | 0.0586 |
| S9 | Aspherical | −64.3805 | 0.5903 | 1.546 | 56.11 | 17.58 | 28.9996 |
| S10 | Aspherical | −8.3793 | 0.2649 | | | | 1.9842 |
| S11 | Aspherical | −2.0719 | 0.3506 | 1.678 | 19.25 | −17.53 | −0.8961 |
| S12 | Aspherical | −2.6813 | 0.0300 | | | | 0.0171 |
| S13 | Aspherical | 2.2072 | 0.5293 | 1.546 | 56.11 | 9.30 | −3.8501 |
| S14 | Aspherical | 3.5752 | 0.7192 | | | | −2.5177 |
| S15 | Aspherical | 2.2425 | 0.4800 | 1.536 | 55.74 | −10.80 | −7.1528 |
| S16 | Aspherical | 1.4960 | 0.7743 | | | | −3.5357 |
| S17 | Spherical | Infinite | 0.2100 | 1.517 | 64.17 | | |
| S18 | Spherical | Infinite | 0.4000 | | | | |
| S19 | Spherical | Infinite | | | | | |

In embodiment 3, both an object-side surface and an image-side surface of any lens in the first lens E1 to the eighth lens E8 are aspheric surfaces, Table 6 shows the higher-order coefficients A4, A6, A8, A10, A12, A14, A16, A18 and A20 applicable to the aspherical mirror surfaces S1-S16 in embodiment 3.

TABLE 6

| Surface number | A4 | A6 | A8 | A10 | A12 |
|---|---|---|---|---|---|
| S1 | −1.9089E−02 | −8.6510E−04 | −7.1061E−03 | 8.8318E−03 | −6.8434E−03 |
| S2 | −4.0420E−02 | −1.3523E−02 | 6.1440E−03 | −9.8506E−03 | 9.9765E−03 |
| S3 | −1.7301E−02 | −1.4230E−02 | 1.7521E−02 | −2.6767E−02 | 2.3422E−02 |
| S4 | −1.5013E−02 | 4.2543E−02 | −6.8837E−02 | 6.3721E−02 | −3.5036E−02 |
| S5 | 1.9602E−03 | 3.0161E−02 | −6.9442E−02 | 7.2065E−02 | −4.1594E−02 |
| S6 | 2.1392E−02 | −3.0257E−02 | −1.0392E−03 | 2.4160E−02 | −2.0108E−02 |
| S7 | −3.9084E−02 | −8.7321E−03 | −3.3757E−03 | 1.1234E−02 | −4.6398E−03 |
| S8 | −5.4283E−02 | 2.3930E−02 | −2.5426E−02 | 1.7116E−02 | −4.3740E−03 |
| S9 | −3.0525E−02 | 2.3985E−02 | −3.3432E−02 | 3.4716E−02 | −2.5523E−02 |
| S10 | −7.1786E−02 | 5.8072E−02 | −4.2814E−02 | 1.7263E−02 | −1.5999E−03 |
| S11 | 3.0847E−03 | 7.4330E−02 | −1.0361E−01 | 7.6309E−02 | −3.4434E−02 |
| S12 | −6.6151E−03 | 4.3776E−02 | −5.4597E−02 | 3.9451E−02 | −1.7586E−02 |
| S13 | 1.2885E−02 | −1.3214E−02 | 3.7097E−03 | −1.2862E−03 | 3.8273E−04 |
| S14 | 3.1582E−02 | −1.7158E−02 | 1.8150E−03 | 5.0360E−04 | −2.1318E−04 |
| S15 | −8.9553E−02 | 2.0911E−02 | −3.5972E−03 | 6.4045E−04 | −9.5468E−05 |
| S16 | −7.9598E−02 | 2.7547E−02 | −8.0284E−03 | 1.7265E−03 | −2.5758E−04 |

TABLE 6-continued

| Surface number | A14 | A16 | A18 | A20 |
|---|---|---|---|---|
| S1 | 3.0771E−03 | −7.7689E−04 | 1.0382E−04 | −5.7681E−06 |
| S2 | −4.6516E−03 | 1.1287E−03 | −1.3961E−04 | 6.9558E−06 |
| S3 | −1.0538E−02 | 2.5524E−03 | −3.1934E−04 | 1.6208E−05 |
| S4 | 1.1496E−02 | −2.2019E−03 | 2.2632E−04 | −9.6091E−06 |
| S5 | 1.3611E−02 | −2.3816E−03 | 1.8128E−04 | −1.9236E−06 |
| S6 | 8.0082E−03 | −1.6573E−03 | 1.5215E−04 | −2.7785E−06 |
| S7 | −7.9368E−04 | 1.1244E−03 | −3.2332E−04 | 3.1953E−05 |
| S8 | −1.3533E−03 | 1.2165E−03 | −3.1083E−04 | 2.8500E−05 |
| S9 | 1.2830E−02 | −4.1823E−03 | 7.8533E−04 | −6.3407E−05 |
| S10 | −1.3516E−03 | 5.4648E−04 | −8.1382E−05 | 4.4677E−06 |
| S11 | 1.0062E−02 | −1.8591E−03 | 1.9634E−04 | −9.0007E−06 |
| S12 | 4.9731E−03 | −8.5673E−04 | 8.1279E−05 | −3.2438E−06 |
| S13 | −7.3188E−05 | 8.0686E−06 | −4.5633E−07 | 1.0038E−08 |
| S14 | 3.5922E−05 | −3.3267E−06 | 1.6522E−07 | −3.4278E−09 |
| S15 | 9.5963E−06 | −5.9711E−07 | 2.0964E−08 | −3.1990E−10 |
| S16 | 2.5478E−05 | −1.5713E−06 | 5.4208E−08 | −7.9478E−10 |

Figure 6A:
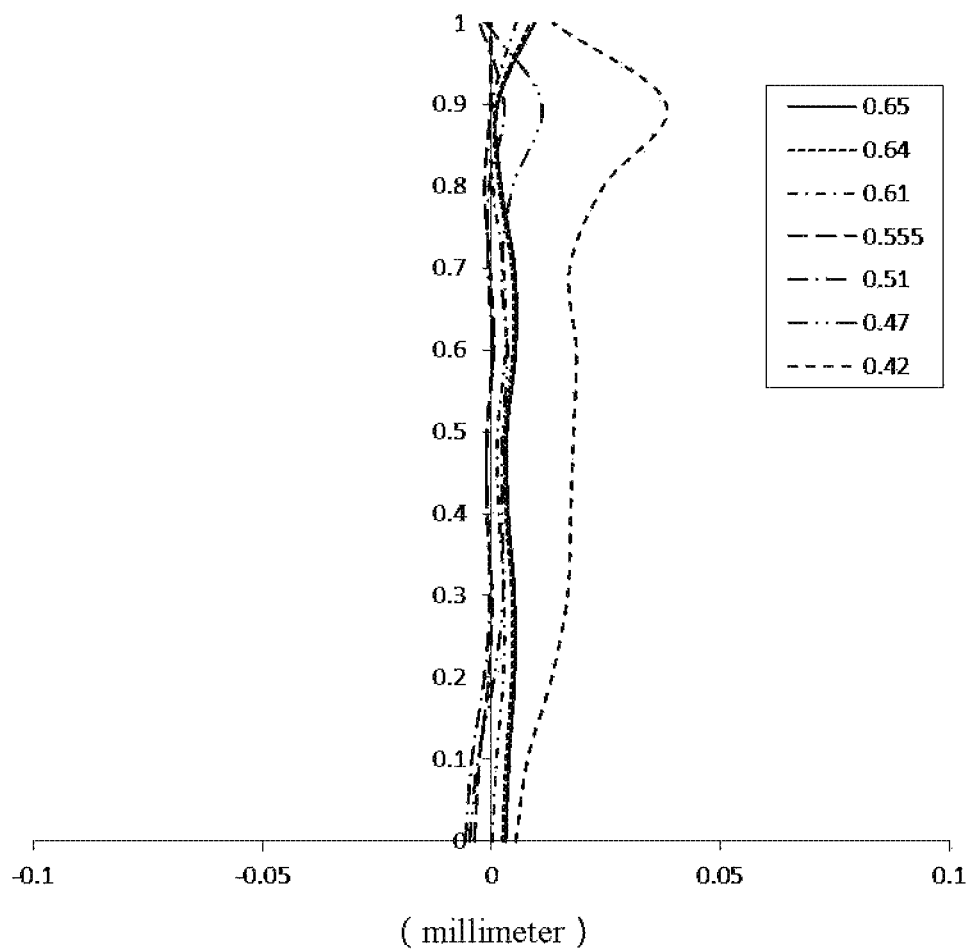
FIG. 6A to FIG. 6D shows a longitudinal aberration curve, astigmatism curve, distortion curve and lateral color curve of an optical imaging lens according to a third embodiment respectively.
Figure 6B:
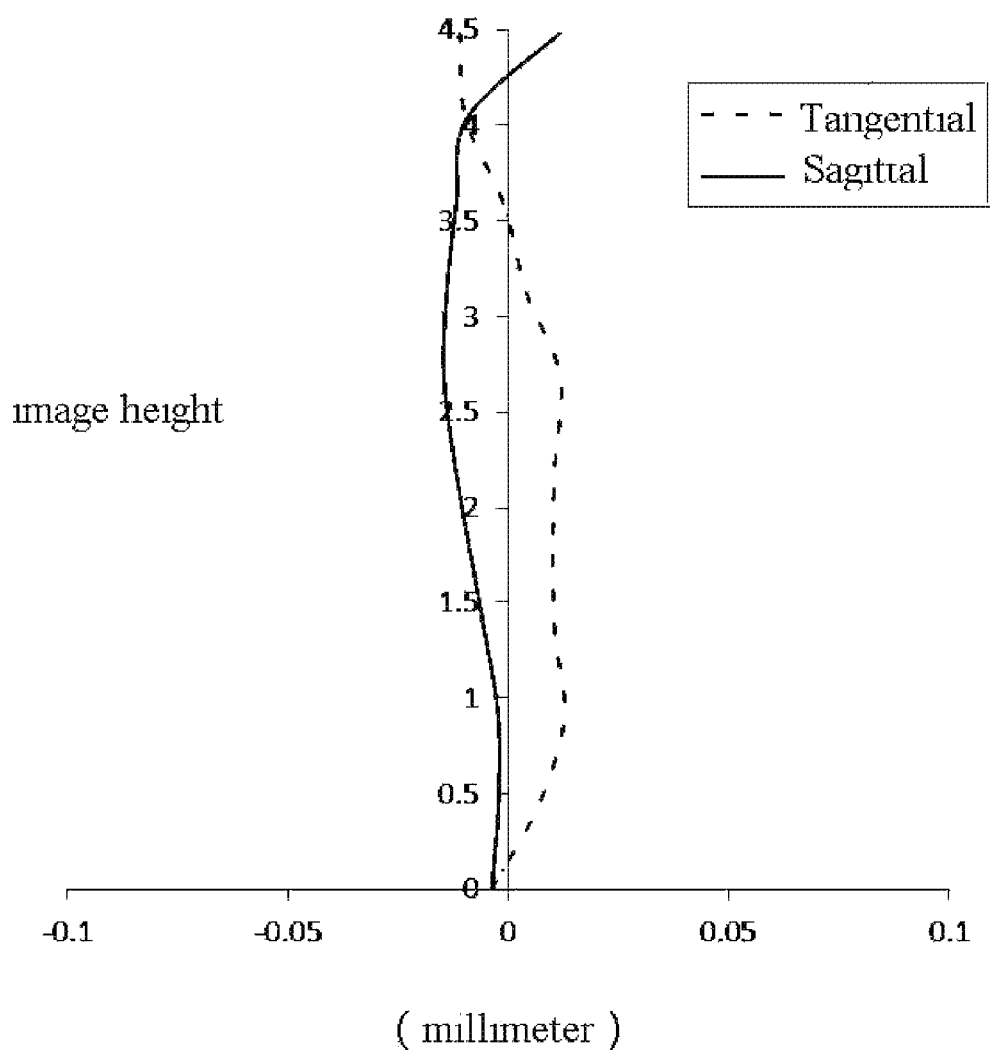
Figure 6C:
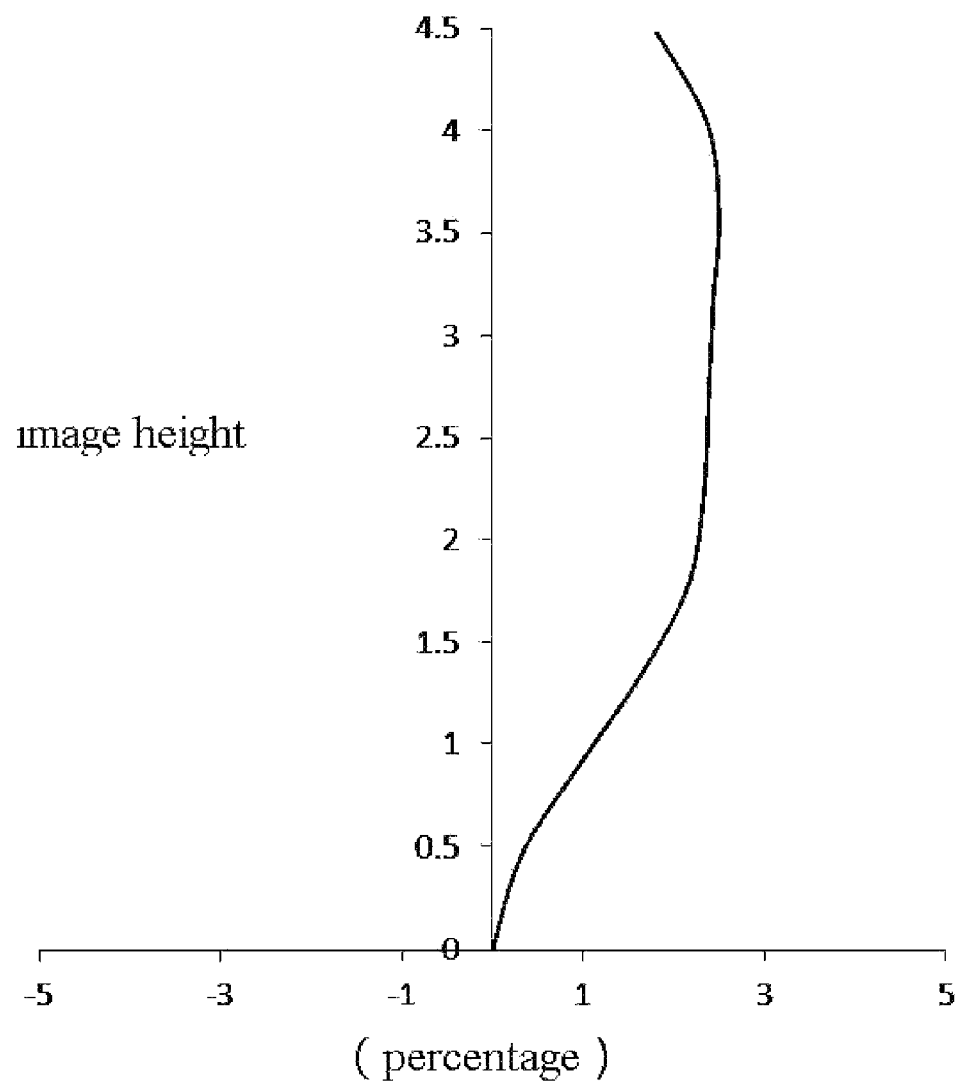
Figure 6D:
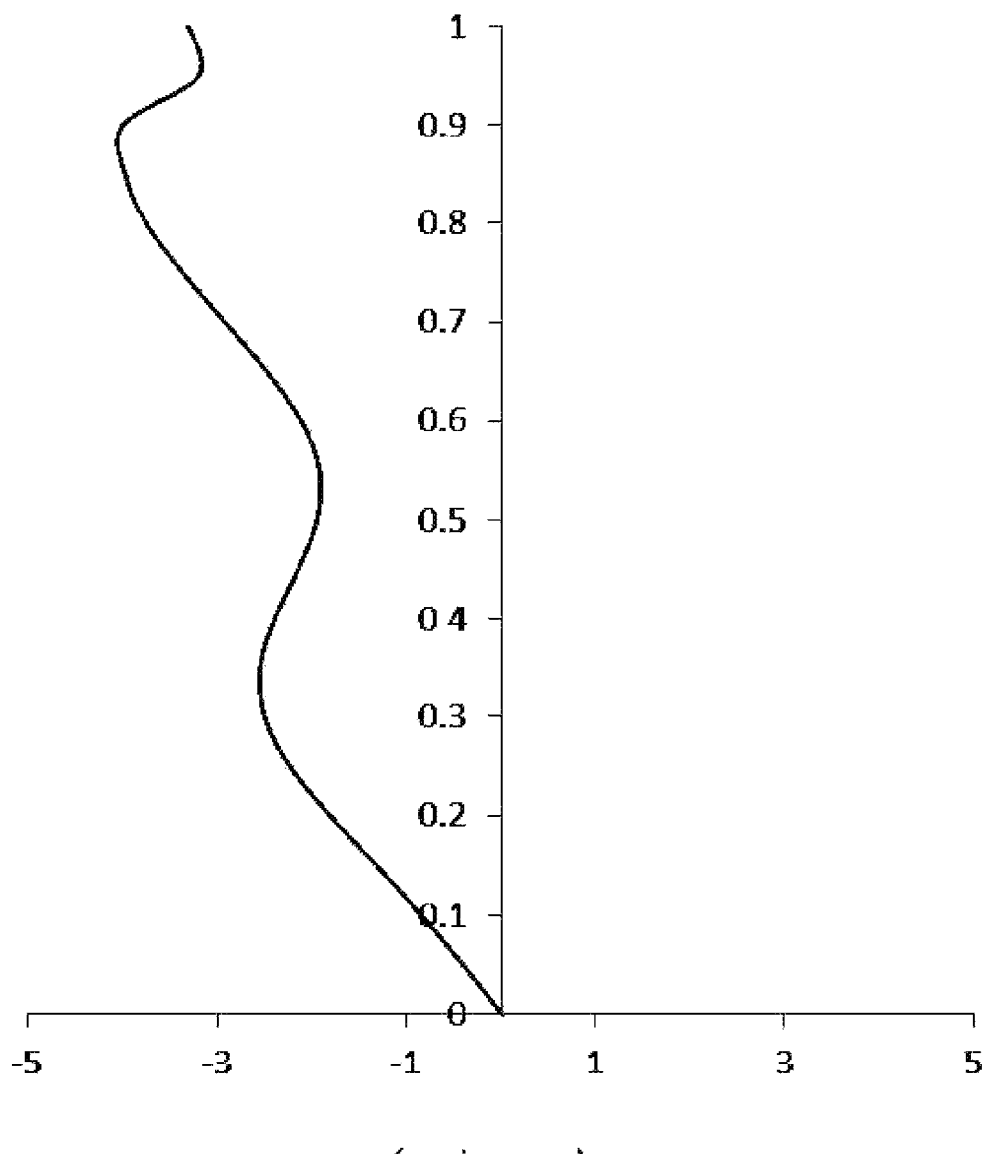

FIG. 6A shows a longitudinal aberration curve of the optical imaging lens according to embodiment 3 to represent deviation of a convergence focal point after light with different wavelengths passes through the lens. FIG. 6B shows an astigmatism curve of the optical imaging lens according to embodiment 3 to represent a tangential image surface curvature and a sagittal image surface curvature. FIG. 6C shows a distortion curve of the optical imaging lens according to embodiment 3 to represent distortion values corresponding to different image heights. FIG. 6D shows a lateral color curve of the optical imaging lens according to embodiment 3 to represent deviation of different image heights on the imaging surface after the light passes through the lens. According to FIG. 6A to FIG. 6D, it can be seen that the optical imaging lens provided in embodiment 3 may achieve high imaging quality.

Embodiment 4

Figure 7:
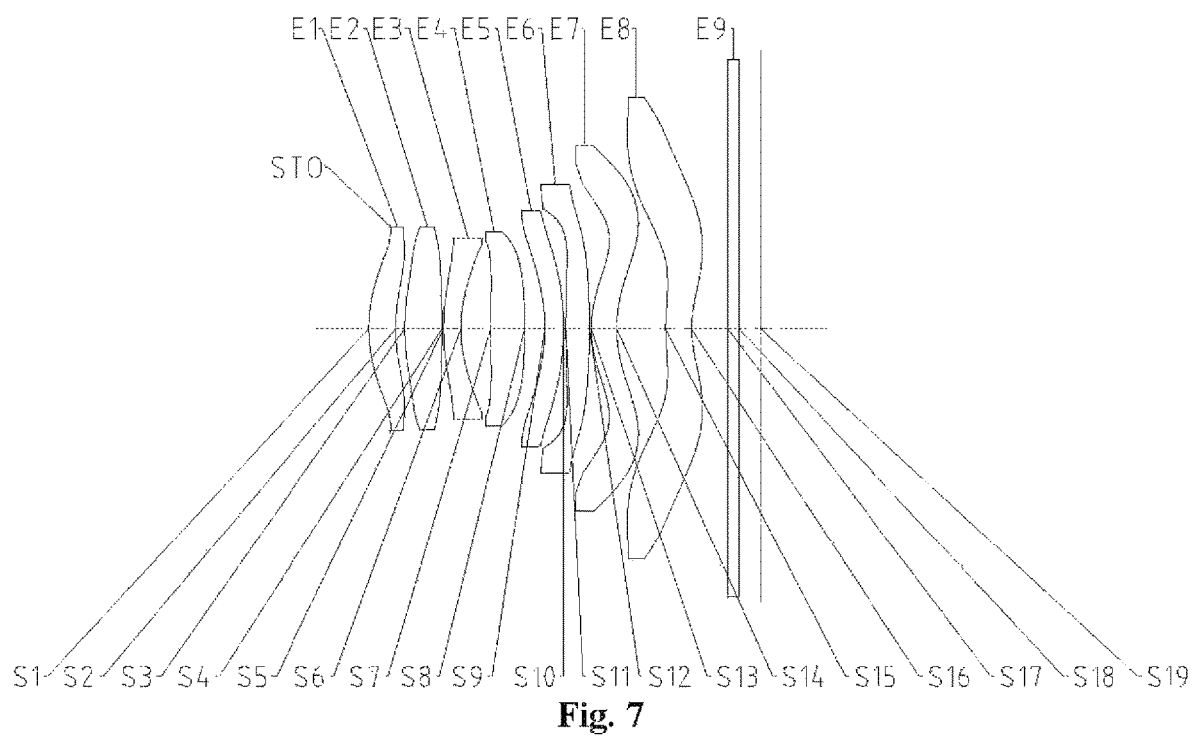
FIG. 7 is a schematic structural view of an optical imaging lens according to a forth embodiment of the disclosure.

The optical imaging lens according to embodiment 4 of the disclosure will be described below with reference to FIG. 7 to FIG. 8D. FIG. 7 shows a schematic structural view of the optical imaging lens according to embodiment 4 of the disclosure;

As shown in FIG. 7, an optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7, an eighth lens E8, a filter E9 and an imaging surface S19.

The first lens E1 has the positive refractive power, an object-side surface S1 thereof is a convex surface, and an image-side surface S2 is a concave surface. The second lens E2 has the positive refractive power, an object-side surface S3 thereof is a convex surface, and an image-side surface S4 is a convex surface. The third lens E3 has the negative refractive power, an object-side surface S5 thereof is a convex surface, and an image-side surface S6 is a concave surface. The fourth lens E4 has the positive refractive power, an object-side surface S7 thereof is a convex surface, and an image-side surface S8 is a convex surface. The fifth lens E5 has the negative refractive power, an object-side surface S9 thereof is a concave surface, and an image-side surface S10 is a convex surface. The sixth lens E6 has the positive refractive power, an object-side surface S11 thereof is a convex surface, and an image-side surface S12 is a convex surface. The seventh lens E7 has the positive refractive power, an object-side surface S13 thereof is a convex surface, and an image-side surface S14 is a concave, surface. The eighth lens E8 has the negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

In the embodiment, the total effective focal length f of the optical imaging lens is 5.72 mm, the distance TTL from the object-side surface S1 of the first lens E1 to the imaging surface S19 on the optical axis is 7.31 mm, and the maximum FOV of the optical imaging lens is 83.8 degrees.

Table 7 shows basic parameters of the optical imaging lens of embodiment 4, in which the units of curvature radius, thickness/distance and focal length are millimeter (mm).

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.3951 | | | | |
| S1 | Aspherical | 2.7754 | 0.5032 | 1.546 | 56.11 | 22.00 | −0.6629 |
| S2 | Aspherical | 3.3787 | 0.1664 | | | | −0.1226 |
| S3 | Aspherical | 4.1837 | 0.6944 | 1.546 | 56.11 | 6.45 | 0.3705 |
| S4 | Aspherical | −20.9090 | 0.0300 | | | | 57.4987 |
| S5 | Aspherical | 3.9053 | 0.3200 | 1.666 | 20.40 | −10.68 | 0.7827 |
| S6 | Aspherical | 2.4397 | 0.5594 | | | | 0.0382 |
| S7 | Aspherical | 28.0316 | 0.6338 | 1.546 | 56.11 | 15.34 | −98.7085 |

TABLE 7-continued

| Surface number | Surface type | Curvature radius | Thickness/ distance | Material Refractive index | Abbe number | Focal length | Conic coefficient |
|---|---|---|---|---|---|---|---|
| S8 | Aspherical | −11.8486 | 0.3744 | | | | 35.7074 |
| S9 | Aspherical | −3.0912 | 0.3500 | 1.678 | 19.25 | −14.51 | −0.7012 |
| S10 | Aspherical | −4.7148 | 0.0407 | | | | 0.9329 |
| S11 | Aspherical | 76.7530 | 0.4500 | 1.570 | 37.32 | 26.03 | −99.0000 |
| S12 | Aspherical | −18.3698 | 0.0300 | | | | 34.4968 |
| S13 | Aspherical | 2.0357 | 0.4800 | 1.546 | 56.11 | 12.56 | −4.6269 |
| S14 | Aspherical | 2.6543 | 0.9075 | | | | −4.1651 |
| S15 | Aspherical | 3.3053 | 0.4800 | 1.536 | 55.74 | −8.20 | −29.6260 |
| S16 | Aspherical | 1.7919 | 0.6830 | | | | −6.9052 |
| S17 | Spherical | Infinite | 0.2100 | 1.517 | 64.17 | | |
| S18 | Spherical | Infinite | 0.4000 | | | | |
| S19 | Spherical | Infinite | | | | | |

In embodiment 4, both an object-side surface and an image-side surface of any lens in the first lens E1 to the eighth lens E8 are aspheric surfaces. Table 8 shows the higher-order coefficients A4, A6, A8, A10, A12, A14, A16, A18 and A20 applicable to the aspherical mirror surfaces S1-S16 in embodiment 4.

TABLE 8

| Surface number | A4 | A6 | A8 | A10 | A12 |
|---|---|---|---|---|---|
| S1 | −5.7745E−03 | −2.5768E−03 | 1.9182E−03 | −3.5539E−03 | 2.8737E−03 |
| S2 | −2.3557E−02 | −1.3688E−02 | 1.1586E−02 | −1.5232E−02 | 1.1852E−02 |
| S3 | −1.2459E−02 | −1.4632E−02 | 1.5042E−02 | −1.9862E−02 | 1.5914E−02 |
| S4 | 8.8451E−03 | 9.6377E−05 | −1.4427E−02 | 1.4915E−02 | −7.3287E−03 |
| S5 | −3.6301E−02 | 1.9652E−02 | −2.0671E−02 | 1.3144E−02 | −4.1305E−03 |
| S6 | −4.8983E−02 | 2.1195E−02 | −8.1821E−03 | −3.6047E−03 | 7.0993E−03 |
| S7 | −1.1007E−02 | 2.4904E−03 | −1.0939E−02 | 1.6206E−02 | −1.3984E−02 |
| S8 | −7.6546E−04 | −2.1493E−02 | 2.2912E−02 | −2.0955E−02 | 1.3374E−02 |
| S9 | 5.1001E−02 | −5.6175E−02 | 4.8544E−02 | −2.9061E−02 | 1.1816E−02 |
| S10 | 1.8396E−02 | −2.2229E−02 | 1.4238E−02 | −5.5395E−03 | 1.5345E−03 |
| S11 | 1.4232E−02 | −1.1789E−03 | −6.6540E−03 | 3.4263E−03 | −7.4691E−04 |
| S12 | −1.6185E−02 | 1.8703E−02 | −1.0903E−02 | 2.8638E−03 | −3.5085E−04 |
| S13 | 4.5030E−03 | −9.6173E−03 | 1.2380E−03 | −8.2479E−04 | 3.7678E−04 |
| S14 | 1.9425E−02 | −1.2782E−02 | 2.3809E−04 | 8.6487E−04 | −2.5219E−04 |
| S15 | −7.9049E−03 | 1.5556E−02 | −1.1328E−03 | −4.0531E−05 | 1.5766E−05 |
| S16 | −5.5859E−02 | 1.5443E−02 | −3.5387E−03 | 5.7738E−04 | −6.2098E−05 |

| Surface number | A14 | A16 | A18 | A20 |
|---|---|---|---|---|
| S1 | −1.4375E−03 | 4.0919E−04 | −5.8854E−05 | 3.3101E−06 |
| S2 | −4.9246E−03 | 1.1369E−03 | −1.3801E−04 | 6.8576E−06 |
| S3 | −6.6297E−03 | 1.4936E−03 | −1.7429E−04 | 8.2773E−06 |
| S4 | 1.8797E−03 | −2.3207E−04 | 8.8277E−06 | 3.1898E−07 |
| S5 | −2.6119E−04 | 6.0098E−04 | −1.5672E−04 | 1.3047E−05 |
| S6 | −4.5449E−03 | 1.5240E−03 | −2.5722E−04 | 1.6782E−05 |
| S7 | 7.1331E−03 | −2.1482E−03 | 3.4643E−04 | −2.2721E−05 |
| S8 | −5.6649E−03 | 1.5171E−03 | −2.3275E−04 | 1.5518E−05 |
| S9 | −3.1050E−03 | 5.0193E−04 | −4.5372E−05 | 1.7526E−06 |
| S10 | −3.0223E−04 | 3.9384E−05 | −2.9673E−06 | 9.6103E−08 |
| S11 | −1.2372E−05 | 4.3497E−05 | −8.9706E−06 | 6.0931E−07 |
| S12 | 1.4059E−05 | 8.9649E−07 | −8.6741E−08 | 1.1888E−09 |
| S13 | −7.6271E−05 | 7.9933E−06 | −4.2969E−07 | 9.4051E−09 |
| S14 | 3.6191E−05 | −2.9643E−06 | 1.3233E−07 | −2.4966E−09 |
| S15 | −1.4660E−06 | 7.0419E−08 | −1.7703E−09 | 1.8321E−11 |
| S16 | 4.3210E−06 | −1.8795E−07 | 4.6504E−09 | −4.9938E−11 |

Figure 8A:
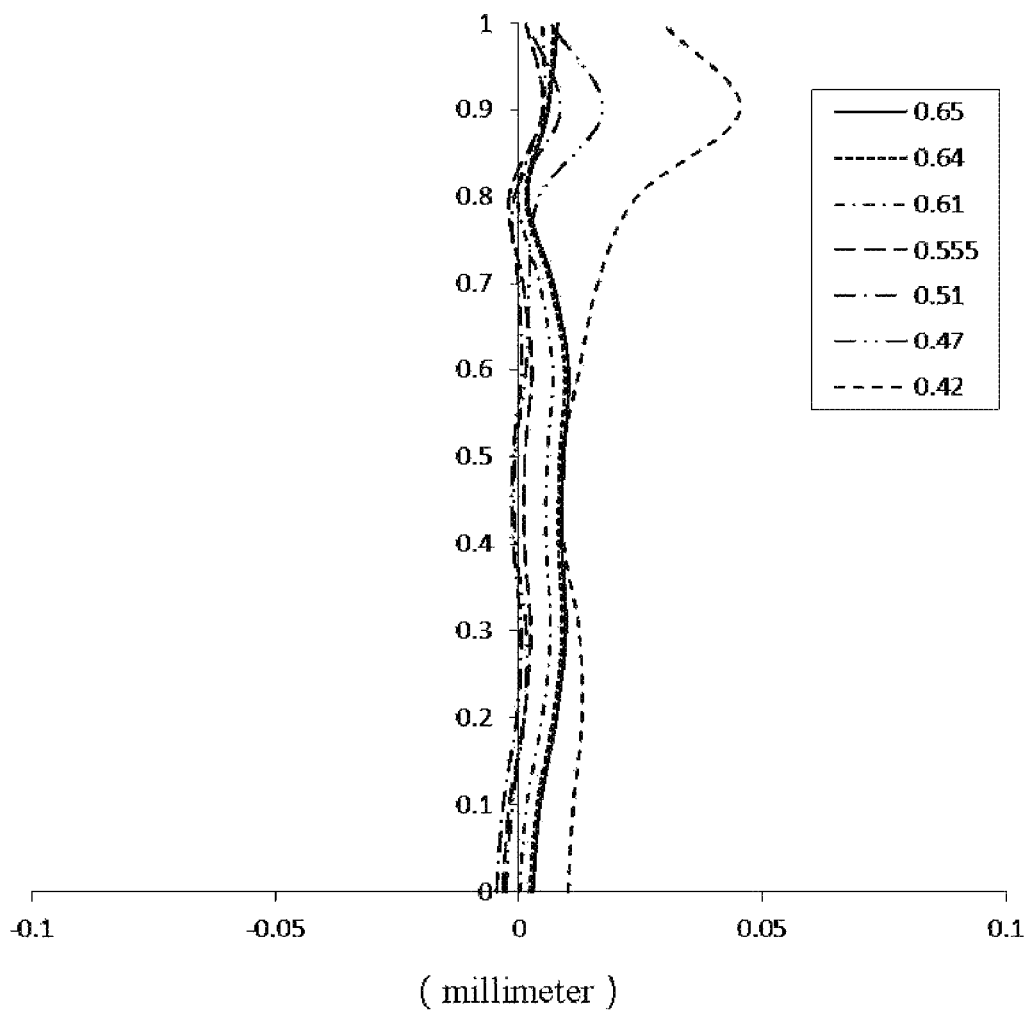
FIG. 8A to FIG. 8D shows a longitudinal aberration curve, astigmatism curve, distortion curve and lateral color curve of an optical imaging lens according to a forth embodiment respectively.
Figure 8B:
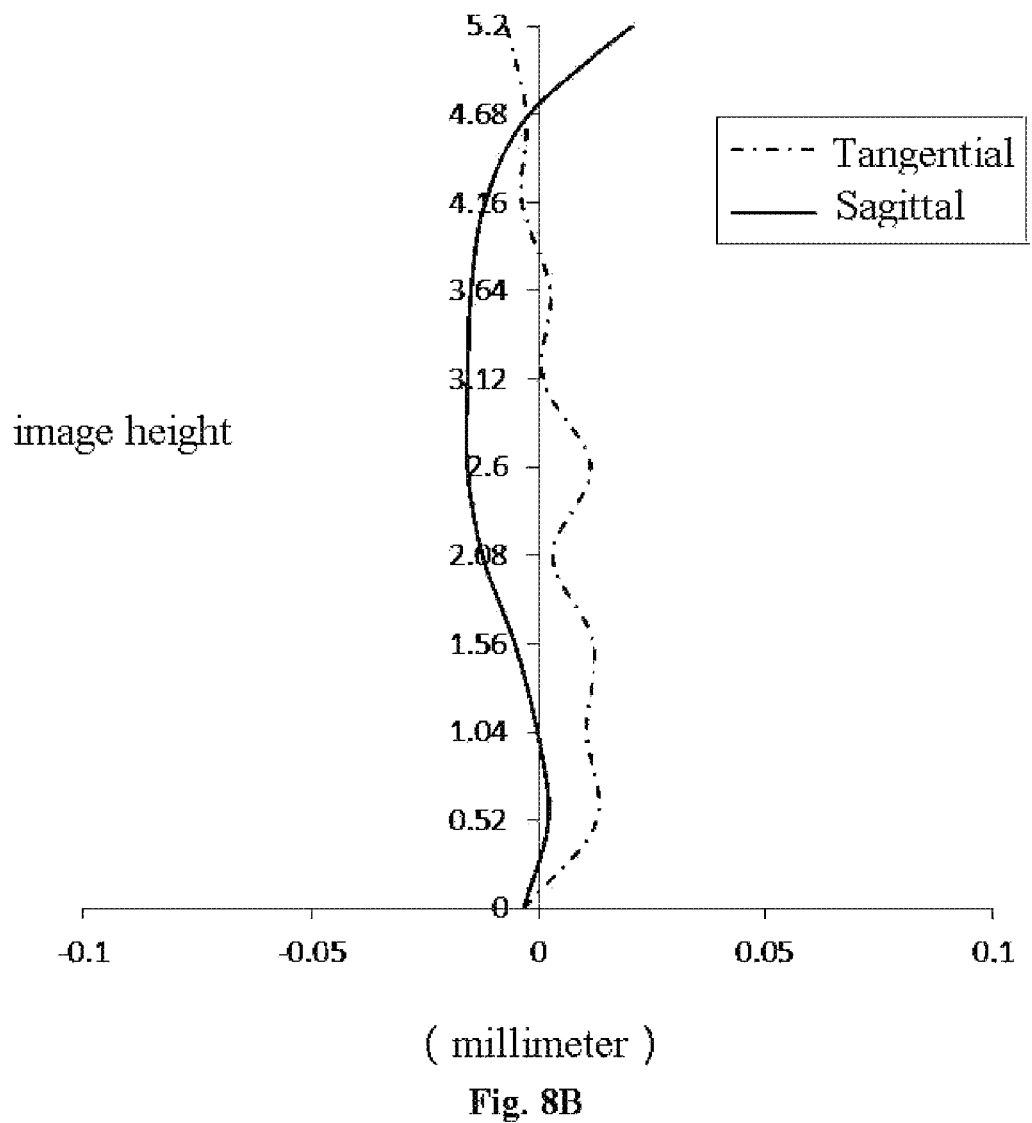
Figure 8C:
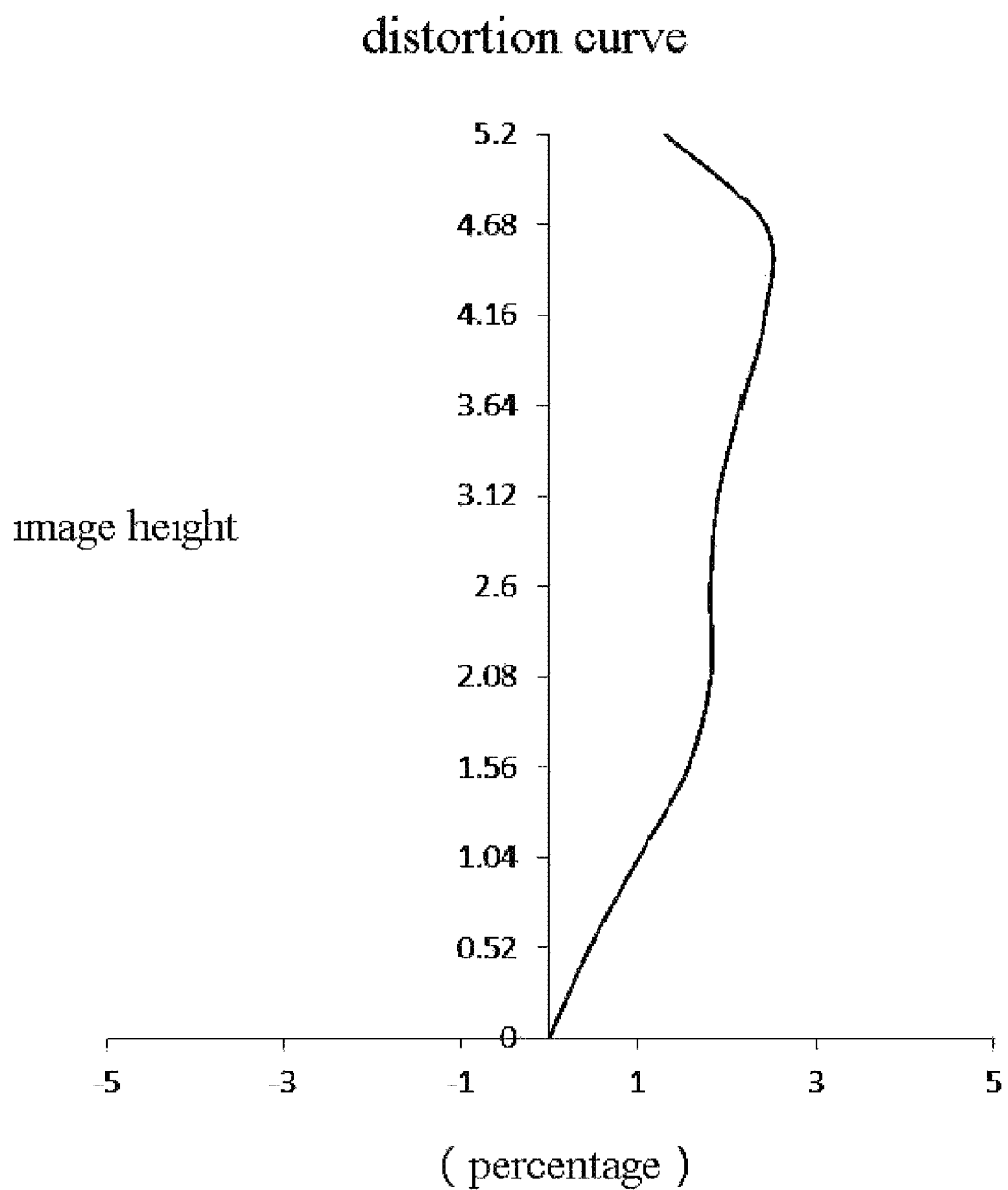
Figure 8D:
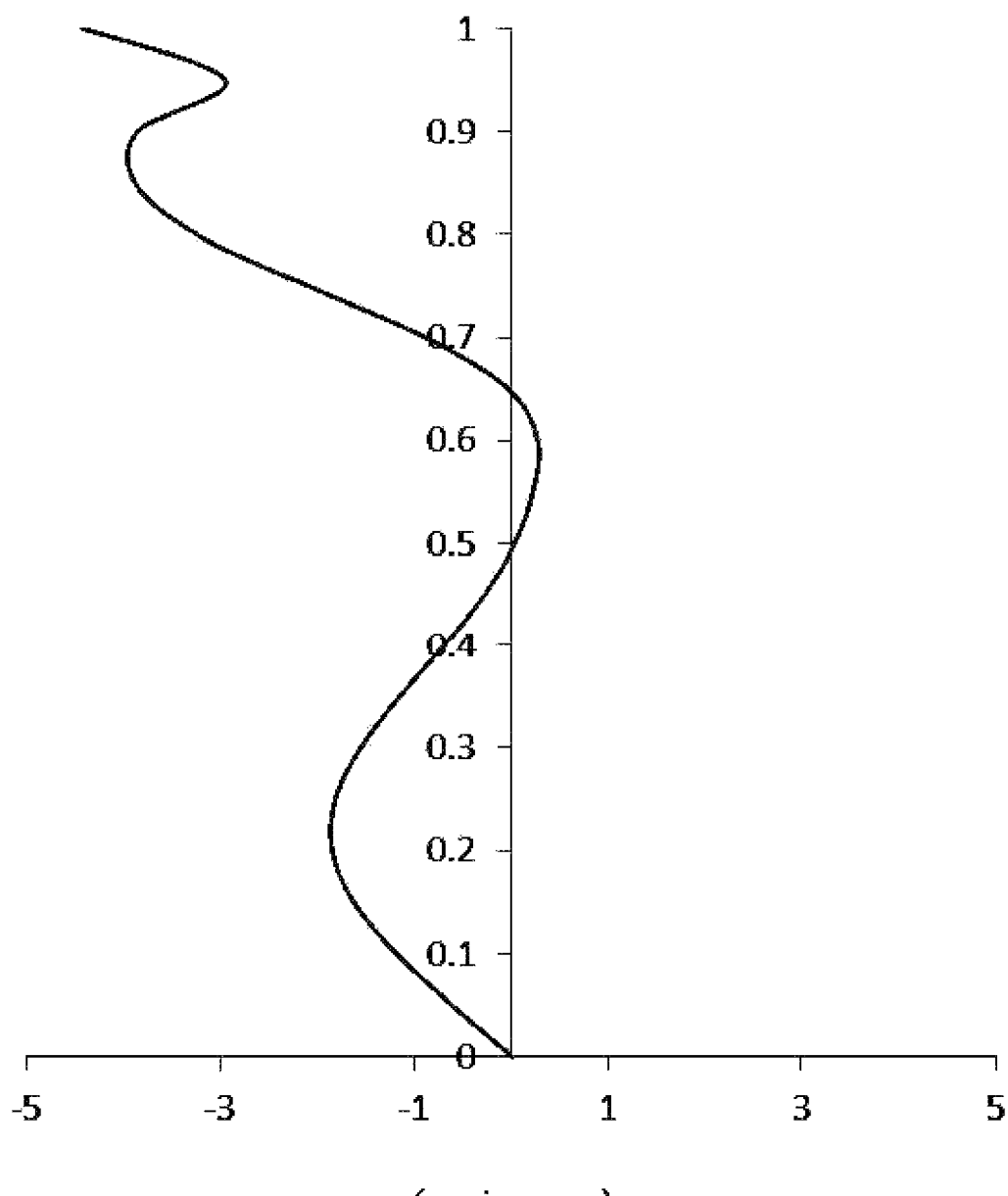

FIG. 8A shows a longitudinal aberration curve of the optical imaging lens according to embodiment 4 to represent deviation of a convergence focal point after light with different wavelengths passes through the lens. FIG. 8B shows an astigmatism curve of the optical imaging lens according to embodiment 4 to represent a tangential image surface curvature and a sagittal image surface curvature. FIG. 8C shows a distortion curve of the optical imaging lens according to embodiment 4 to represent distortion values corresponding to different image heights. FIG. 8D shows a lateral color curve of the optical imaging lens according to embodiment 4 to represent deviation of different image heights on the imaging surface after the light passes through the lens. According to FIG. 8A to FIG. 8D, it can be seen that the optical imaging lens provided in embodiment 4 may achieve high imaging quality.

Embodiment 5

The optical imaging lens according to embodiment 5 of the disclosure will be described below with reference to FIG.

Figure 9:
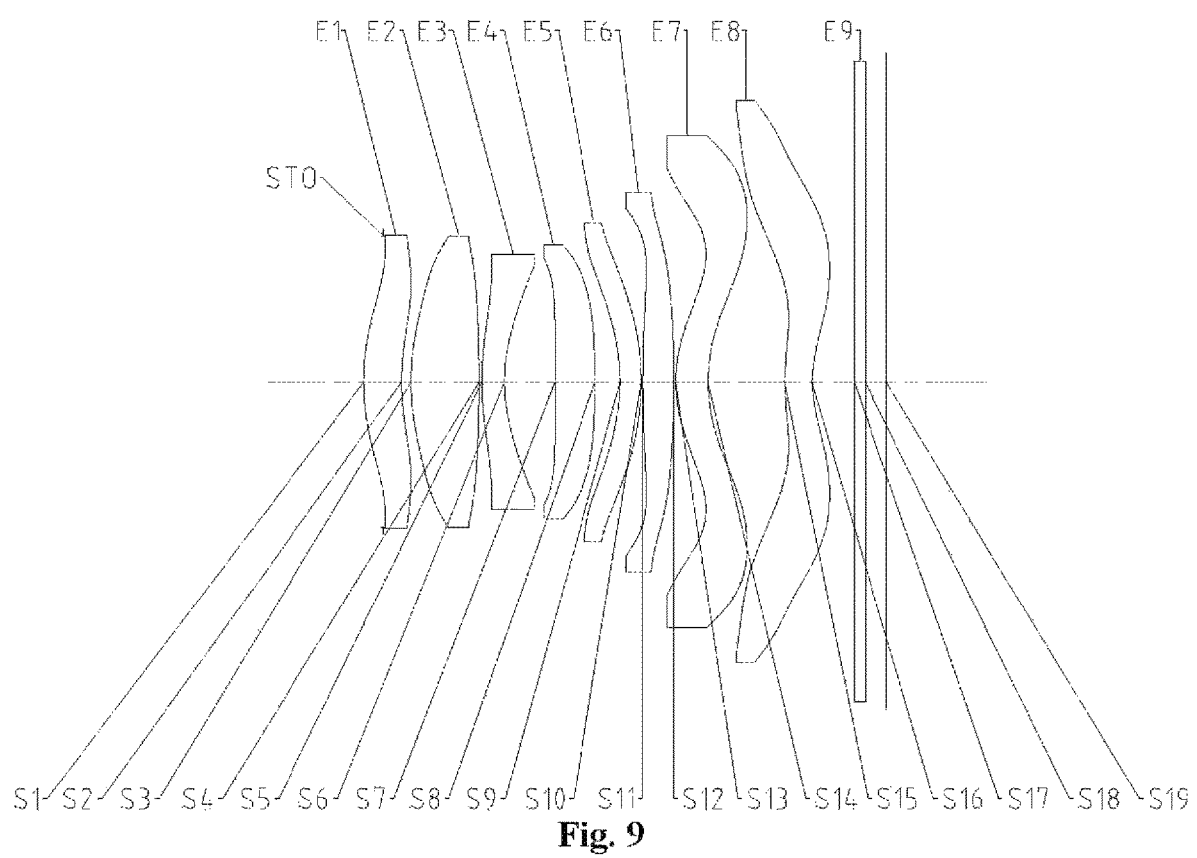
FIG. 9 is a schematic structural view of an optical imaging lens according to a fifth embodiment of the disclosure.
Figure 10A:
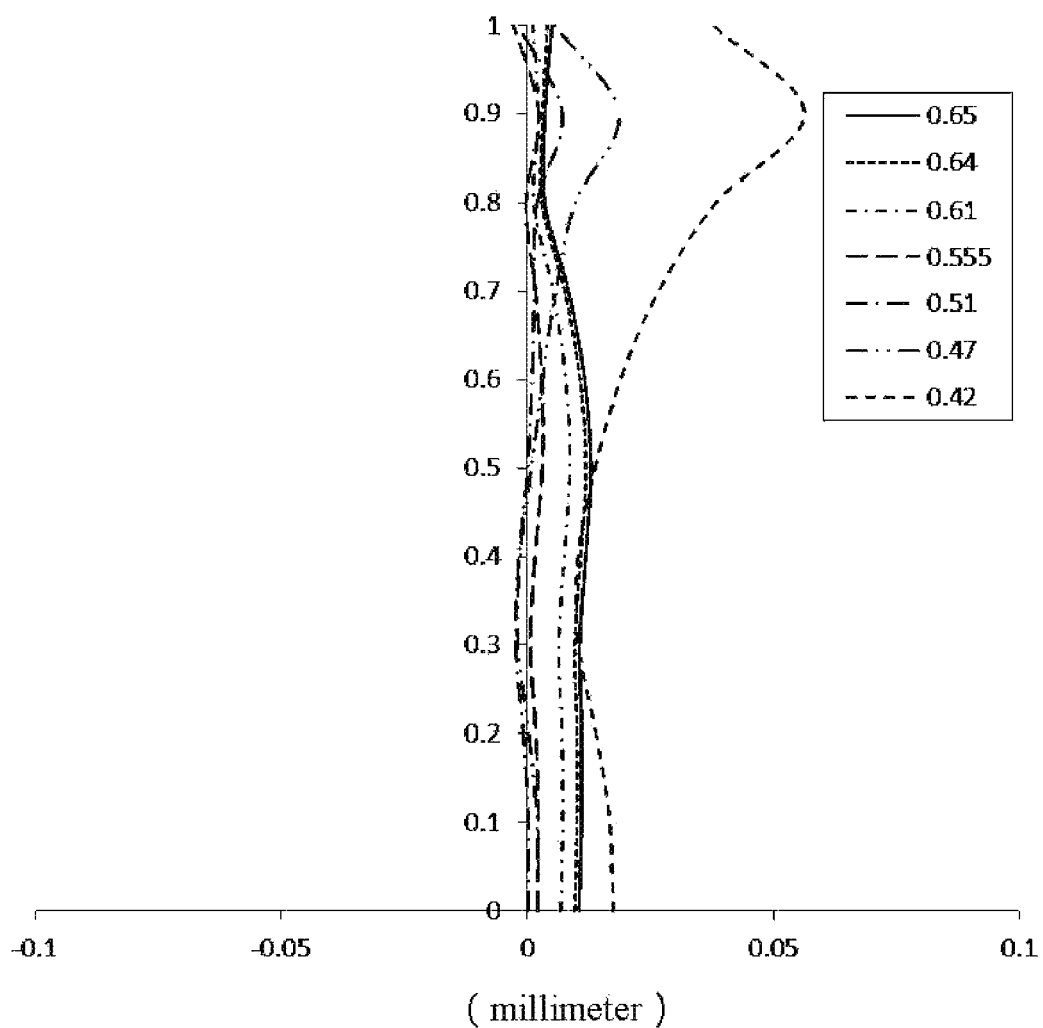
FIG. 10A to FIG. 10D shows a longitudinal aberration curve, astigmatism curve, distortion curve and lateral color curve of an optical imaging lens according to a fifth embodiment respectively.
Figure 10B:
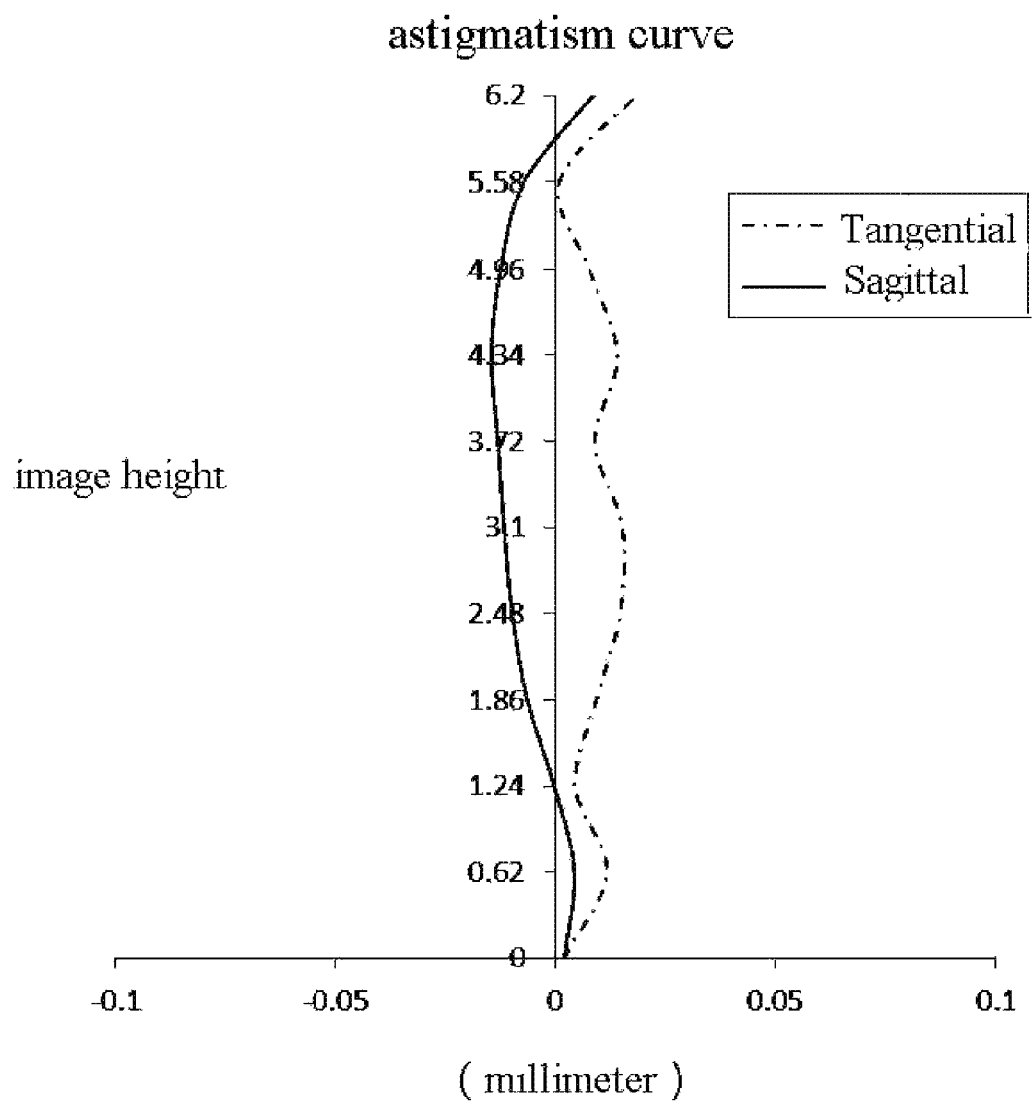
Figure 10C:
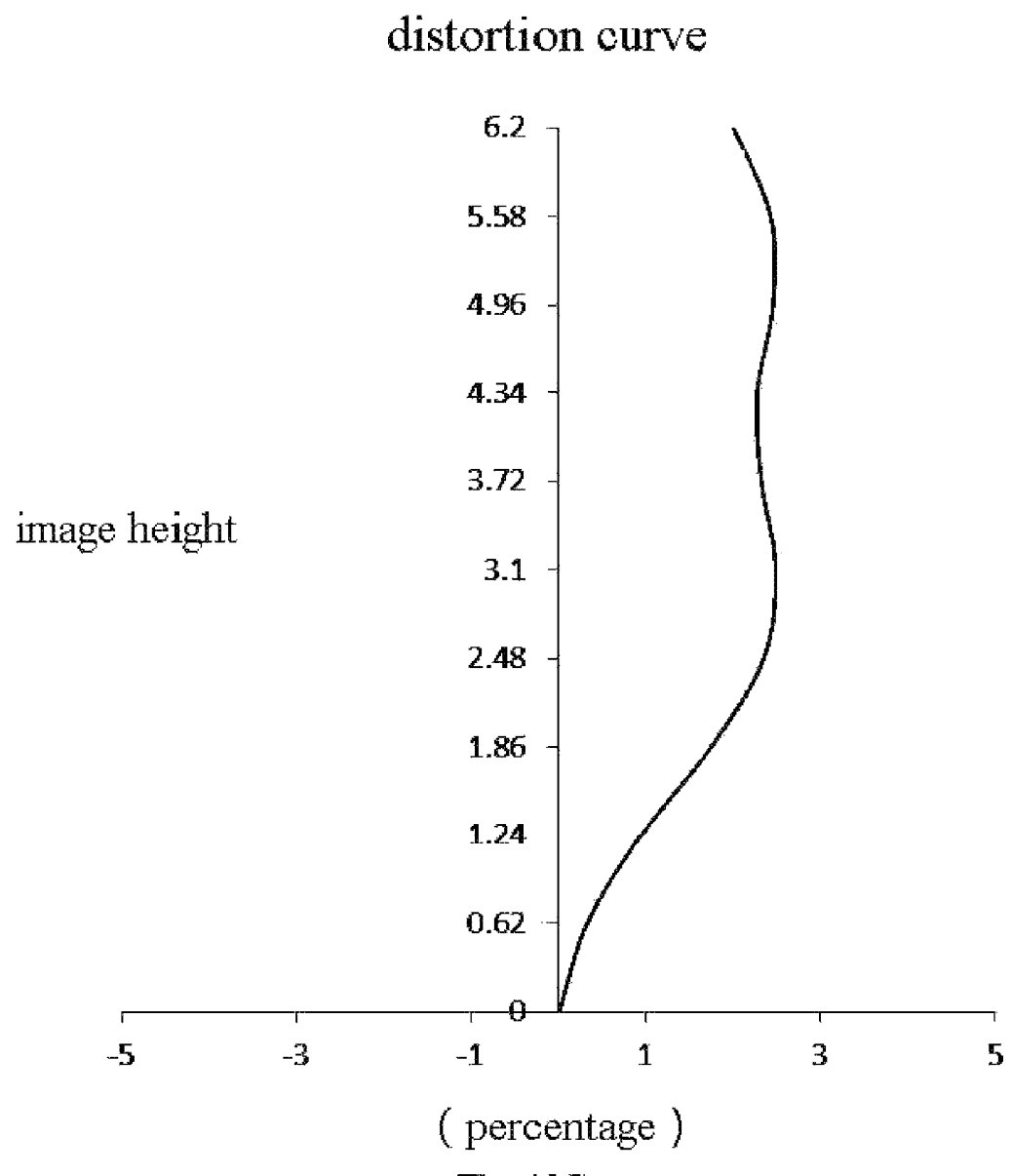
Figure 10D:
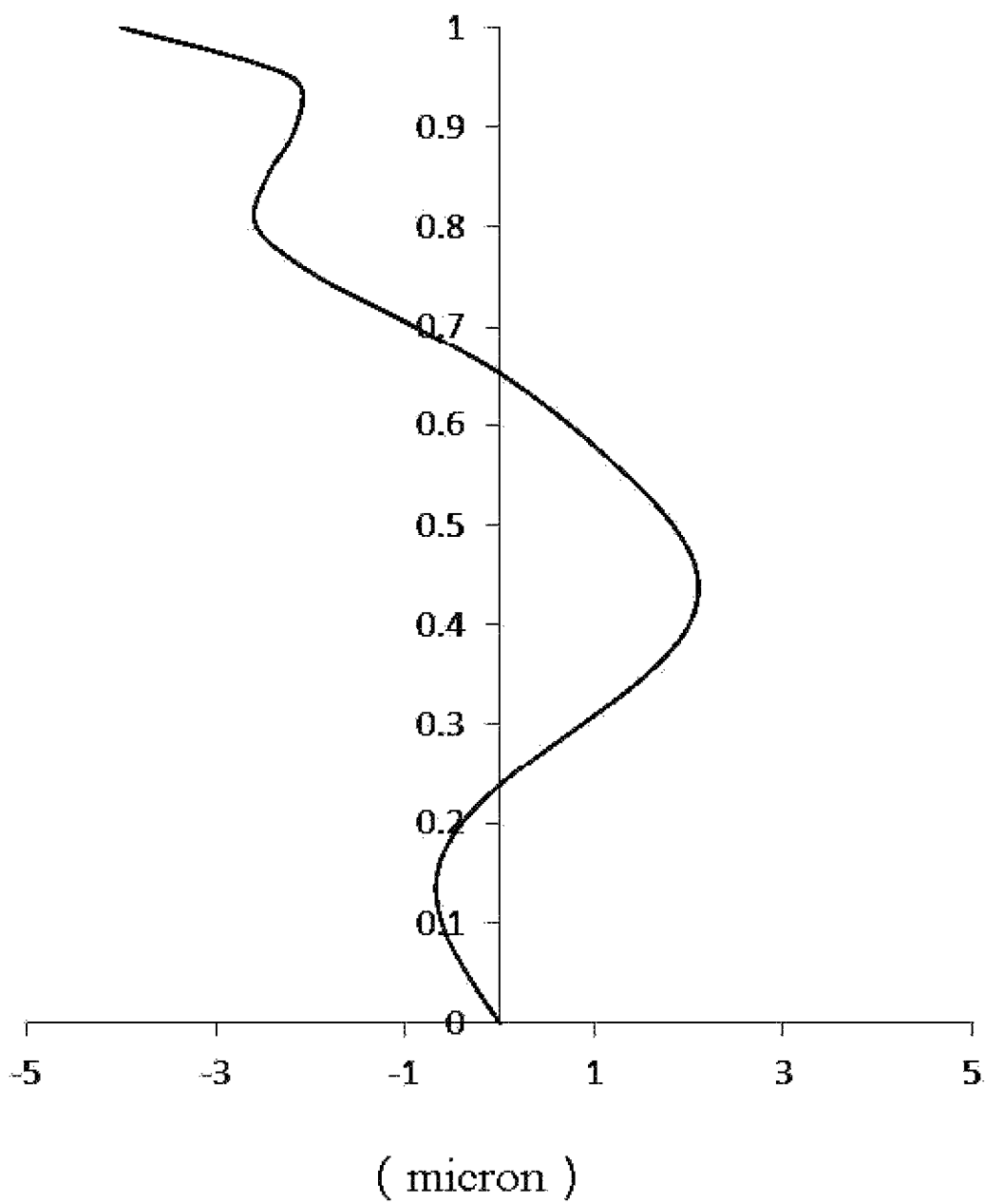

9 to FIG. 10D. FIG. 9 shows a schematic structural view of the optical imaging lens according to embodiment 5 of the disclosure;

As shown in FIG. 9, an optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7, an eighth lens E8, a filter E9 and an imaging surface S19.

The first lens E1 has the positive refractive power, an object-side surface S1 thereof is a convex surface, and an image-side surface S2 is a concave surface. The second lens E2 has the positive refractive power, an object-side surface S3 thereof is a convex surface, and an image-side surface S4 is a convex surface. The third lens E3 has the negative refractive power, an object-side surface S5 thereof is a convex surface, and an image-side surface S6 is a concave surface. The fourth lens E4 has the positive refractive power, an object-side surface S7 thereof is a convex surface, and an image-side surface S8 is a convex surface. The fifth lens E5 has the negative refractive power, an object-side surface S9 thereof is a concave surface, and an image-side surface S10 is a convex surface. The sixth lens E6 has the positive refractive power, an object-side surface S11 thereof is a convex surface, and an image-side surface S12 is a convex surface. The seventh lens E7 has the positive refractive power, an object-side surface S13 thereof is a convex surface, and an image-side surface S14 is a concave surface. The eighth lens E8 has the negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

In the embodiment, the total effective focal length f of the optical imaging lens is 7.51 mm, the distance TTL from the object-side surface S1 of the first lens E1 to the imaging surface S19 on the optical axis is 9.91 mm, and the maximum FOV of the optical imaging lens is 78.0 degrees.

Table 9 shows basic parameters of the optical imaging lens of embodiment 5, in which the units of curvature radius, thickness/distance and focal length are millimeter (mm).

TABLE 9

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.3699 | | | | |
| S1 | Aspherical | 4.3739 | 0.7137 | 1.546 | 56.11 | 88.19 | −0.4074 |
| S2 | Aspherical | 4.5339 | 0.1802 | | | | −0.1367 |
| S3 | Aspherical | 4.4440 | 1.2919 | 1.546 | 56.11 | 6.81 | 0.2059 |
| S4 | Aspherical | −20.3395 | 0.0510 | | | | −22.1093 |
| S5 | Aspherical | 5.3734 | 0.4277 | 1.666 | 20.40 | −12.05 | 0.6619 |
| S6 | Aspherical | 3.1178 | 0.9580 | | | | −0.0212 |
| S7 | Aspherical | 80.3890 | 0.7662 | 1.546 | 56.11 | 26.34 | −99.0000 |
| S8 | Aspherical | −17.4511 | 0.4767 | | | | 31.8526 |
| S9 | Aspherical | −3.5386 | 0.4000 | 1.678 | 19.25 | −23.41 | −0.8614 |
| S10 | Aspherical | −4.7626 | 0.0300 | | | | 0.3508 |
| S11 | Aspherical | 32.5077 | 0.5909 | 1.570 | 37.32 | 24.20 | −77.6345 |
| S12 | Aspherical | −23.8268 | 0.0300 | | | | 29.9193 |
| S13 | Aspherical | 2.6233 | 0.6113 | 1.546 | 56.11 | 18.39 | −3.8769 |
| S14 | Aspherical | 3.2590 | 1.4504 | | | | −3.1834 |
| S15 | Aspherical | 3.7560 | 0.5202 | 1.536 | 55.74 | −10.48 | −18.8773 |
| S16 | Aspherical | 2.1436 | 0.8070 | | | | −5.9798 |
| S17 | Spherical | Infinite | 0.2100 | 1.517 | 64.17 | | |
| S18 | Spherical | Infinite | 0.4000 | | | | |
| S19 | Spherical | Infinite | | | | | |

In embodiment 5, both an object-side surface and an image-side surface of any lens in the first lens E1 to the eighth lens E8 are aspheric surfaces. Table 10 shows the higher-order coefficients A4, A6, A8, A10, A12, A14, A16, A18 and A20 applicable to the aspherical mirror surfaces S1-S16 in embodiment 5.

TABLE 10

| Surface number | A4 | A6 | A8 | A10 | A12 |
|---|---|---|---|---|---|
| S1 | −5.2577E−03 | −1.6537E−04 | −4.0081E−04 | 2.3527E−04 | −9.0598E−05 |
| S2 | −1.4678E−02 | −1.9287E−03 | −2.2327E−03 | 3.4100E−04 | −8.1106E−05 |
| S3 | −6.4090E−03 | −1.8961E−03 | 2.4872E−05 | 9.0267E−05 | 4.0872E−05 |
| S4 | 7.6248E−03 | −3.3860E−03 | 2.0635E−04 | 2.6123E−04 | −1.0335E−04 |
| S5 | −1.6833E−02 | 3.4172E−03 | −2.6428E−03 | 1.4415E−03 | −4.8116E−04 |
| S6 | −2.5163E−02 | 7.4406E−03 | −3.6711E−03 | 1.5981E−03 | −5.1572E−04 |
| S7 | −3.3792E−03 | −3.1396E−03 | 2.7068E−03 | −1.5652E−03 | 5.9104E−04 |
| S8 | −1.1789E−03 | −5.7255E−03 | 3.0799E−03 | −1.2534E−03 | 3.7688E−04 |
| S9 | 2.7232E−02 | −1.8396E−02 | 8.5094E−03 | −2.5051E−03 | 4.8780E−04 |
| S10 | 1.1717E−02 | −9.4321E−03 | 4.5817E−03 | −1.2942E−03 | 2.3445E−04 |
| S11 | 3.4751E−03 | −3.6386E−04 | −2.3018E−04 | 8.2121E−05 | −2.1463E−05 |

TABLE 10-continued

| | | | | | |
|---|---|---|---|---|---|
| S12 | −3.3194E−03 | 2.0361E−03 | −6.2965E−04 | 9.6010E−05 | −9.9261E−06 |
| S13 | 1.5703E−03 | −1.1704E−03 | −9.7258E−05 | 5.0171E−06 | 3.1127E−06 |
| S14 | 7.7123E−03 | −2.0889E−03 | −1.2808E−04 | 7.4575E−05 | −1.0048E−05 |
| S15 | −3.5711E−02 | 4.1905E−03 | −1.8024E−04 | −4.8533E−06 | 1.0104E−06 |
| S16 | −2.3728E−02 | 3.6620E−03 | −4.5892E−04 | 4.2923E−05 | −3.0334E−06 |

| Surface number | A14 | A16 | A18 | A20 |
|---|---|---|---|---|
| S1 | 2.0244E−05 | −2.5224E−06 | 1.6551E−07 | −4.5017E−09 |
| S2 | 8.7516E−06 | −3.9581E−07 | −1.5630E−09 | 5.0675E−10 |
| S3 | −2.0787E−05 | 3.3849E−06 | −2.4968E−07 | 7.1118E−09 |
| S4 | 1.8278E−05 | −1.7134E−06 | 8.1764E−08 | −1.5651E−09 |
| S5 | 9.8222E−05 | −1.2018E−05 | 8.2184E−07 | −2.4578E−08 |
| S6 | 1.1241E−04 | −1.5557E−05 | 1.2425E−06 | −4.3775E−08 |
| S7 | −1.4895E−04 | 2.3991E−05 | −2.2566E−06 | 9.4485E−08 |
| S8 | −7.8922E−05 | 1.0756E−05 | −8.5818E−07 | 3.0376E−08 |
| S9 | −6.1972E−05 | 4.9343E−06 | −2.2344E−07 | 4.3717E−09 |
| S10 | −2.7892E−05 | 2.1314E−06 | −9.4782E−08 | 1.8485E−09 |
| S11 | 3.6892E−06 | −3.7747E−07 | 2.0680E−08 | −4.6234E−10 |
| S12 | 8.8653E−07 | −6.2103E−08 | 2.6135E−09 | −4.6673E−11 |
| S13 | −4.0910E−07 | 2.0423E−08 | −4.1364E−10 | 1.8603E−12 |
| S14 | 7.1895E−07 | −2.9777E−08 | 6.7284E−10 | −6.4088E−12 |
| S15 | −5.4691E−08 | 1.4710E−09 | −1.8986E−11 | 8.2548E−14 |
| S16 | 1.5553E−07 | −5.1862E−09 | 9.7226E−11 | −7.6753E−13 |

FIG. 10A shows a longitudinal aberration curve of the optical imaging lens according to embodiment 5 to represent deviation of a convergence focal point after light with different wavelengths passes through the lens. FIG. 10B shows an astigmatism curve of the optical imaging lens according to embodiment 5 to represent a tangential image surface curvature and a sagittal image surface curvature. FIG. 10C shows a distortion curve of the optical imaging lens according to embodiment 5 to represent distortion values corresponding to different image heights.

FIG. 10D shows a lateral color curve of the optical imaging lens according to embodiment 5 to represent deviation of different image heights on the imaging surface after the light passes through the lens. According to FIG. 10A to FIG. 10D, it can be seen that the optical imaging lens provided in embodiment 5 may achieve high imaging quality.

Embodiment 6

Figure 11:
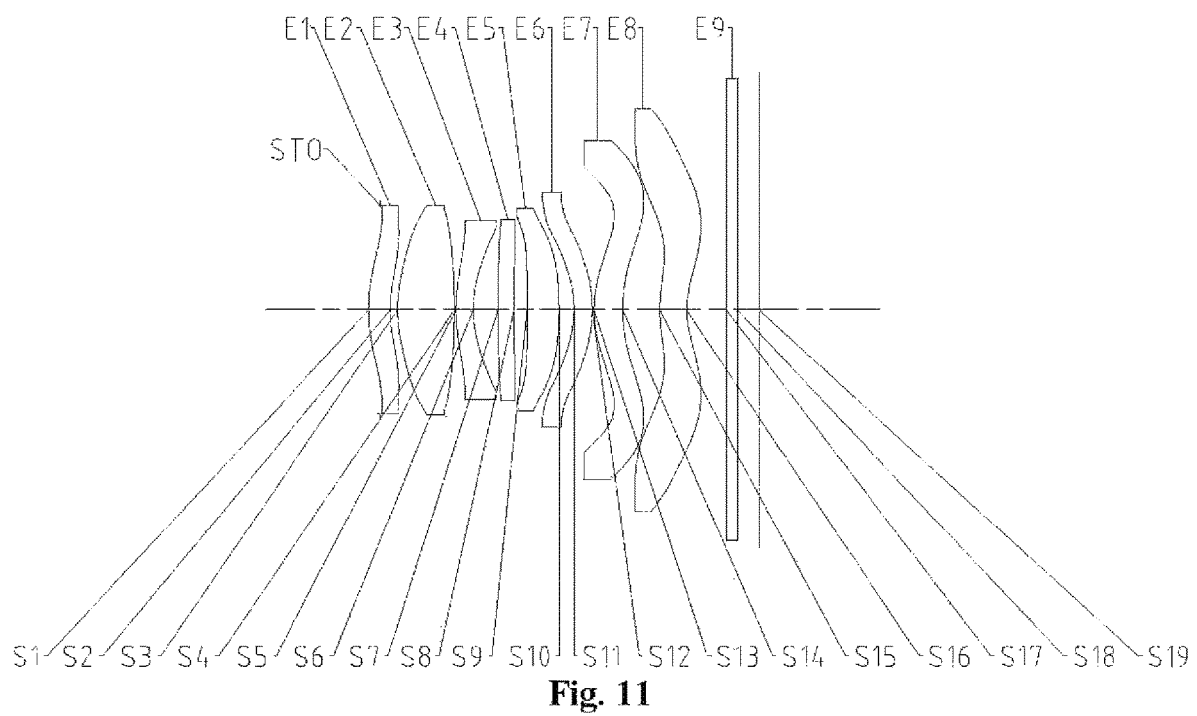
FIG. 11 is a schematic structural view of an optical imaging lens according to a sixth embodiment of the disclosure.

The optical imaging lens according to embodiment 6 of the disclosure will be described below with reference to FIG. 11 to FIG. 12D. FIG. 11 shows a schematic structural view of the optical imaging lens according to embodiment 6 of the disclosure.

As shown in FIG. 11, an optical imaging lens sequentially from an object side to an image side along the optical axis includes: a diaphragm STO, a first lens E1, a second lens E, a third lens E3, a fourth lens E4, a fifth lens E5, a sixth lens E6, a seventh lens E7, an eighth lens E8, a filter E9 and an imaging surface S19.

The first lens E1 has the negative refractive power, an object-side surface S1 thereof is a convex surface, and an image-side surface S2 is a concave surface. The second lens E2 has the positive refractive power, an object-side surface S3 thereof is a convex surface, and an image-side surface S4 is a convex surface. The third lens E3 has the negative refractive power, an object-side surface S5 thereof is a convex surface, and an image-side surface 36 is a concave surface. The fourth lens E4 has the negative refractive power, an object-side surface S7 thereof is a convex surface, and an image-side surface S8 is a concave surface. The fifth lens E5 has the positive refractive power, an object-side surface S9 thereof is a convex surface, and an image-side surface 310 is a convex surface. The sixth lens E6 has the negative refractive power, an object-side surface S11 thereof is a concave surface, and an image-side surface S12 is a convex surface. The seventh lens E7 has the positive refractive power, an object-side surface S13 thereof is a convex surface, and an image-side surface S14 is a concave surface. The eighth lens E8 has the negative refractive power, an object-side surface 315 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

In the embodiment, the total effective focal length f of the optical imaging lens is 5.47 mm, the distance TTL from the object-side surface S1 of the first lens E1 to the imaging surface S19 on the optical axis is 7.28 mm, and the maximum FOV of the optical imaging lens is 77.7 degrees.

Table 11 shows basic parameters of the optical imaging lens of embodiment 6, in which the units of curvature radius, thickness/distance and focal length are millimeter (mm).

TABLE 11

| | | | | Material | | | |
|---|---|---|---|---|---|---|---|
| Surface number | Surface type | Curvature radius | Thickness/ distance | Refractive index | Abbe number | Focal length | Conic coefficient |
| OBJ | Spherical | Infinite | Infinite | | | | |
| STO | Spherical | Infinite | −0.2220 | | | | |

TABLE 11-continued

| Surface number | Surface type | Curvature radius | Thickness/ distance | Material Refractive index | Abbe number | Focal length | Conic coefficient |
|---|---|---|---|---|---|---|---|
| S1 | Aspherical | 3.1292 | 0.4048 | 1.546 | 56.11 | −87.88 | −0.2033 |
| S2 | Aspherical | 2.8034 | 0.1354 | | | | −0.0414 |
| S3 | Aspherical | 2.8632 | 1.0590 | 1.546 | 56.11 | 4.33 | 0.0310 |
| S4 | Aspherical | −11.7621 | 0.0300 | | | | −11.2252 |
| S5 | Aspherical | 3.3314 | 0.3200 | 1.666 | 20.40 | −8.87 | 0.6544 |
| S6 | Aspherical | 2.0493 | 0.4604 | | | | −0.0305 |
| S7 | Aspherical | 38.9389 | 0.3000 | 1.640 | 23.84 | −2640.25 | 99.0000 |
| S8 | Aspherical | 37.9476 | 0.2410 | | | | −99.0000 |
| S9 | Aspherical | 99.9698 | 0.5940 | 1.546 | 56.11 | 14.05 | 99.0000 |
| S10 | Aspherical | −8.2918 | 0.2822 | | | | 1.1006 |
| S11 | Aspherical | −2.0527 | 0.3498 | 1.678 | 19.25 | −17.64 | −0.8808 |
| S12 | Aspherical | −2.6490 | 0.0300 | | | | 0.0027 |
| S13 | Aspherical | 2.2626 | 0.5377 | 1.546 | 56.11 | 9.92 | −4.1391 |
| S14 | Aspherical | 3.5592 | 0.6853 | | | | −2.2098 |
| S15 | Aspherical | 2.4798 | 0.4972 | 1.536 | 55.74 | −9.98 | −12.4942 |
| S16 | Aspherical | 1.5763 | 0.7453 | | | | −4.6894 |
| S17 | Spherical | Infinite | 0.2100 | 1.517 | 64.17 | | |
| S18 | Spherical | Infinite | 0.4000 | | | | |
| S19 | Spherical | Infinite | | | | | |

In embodiment 6, both an object-side surface and an image-side surface of any lens in the first lens E1 to the eighth lens E8 are aspheric surfaces. Table 12 shows the higher-order coefficients A4, A6, A8, A10, A12, A14, A16, A18 and A20 applicable to the aspherical mirror surfaces S1-S16 in embodiment 6.

Figure 12A:
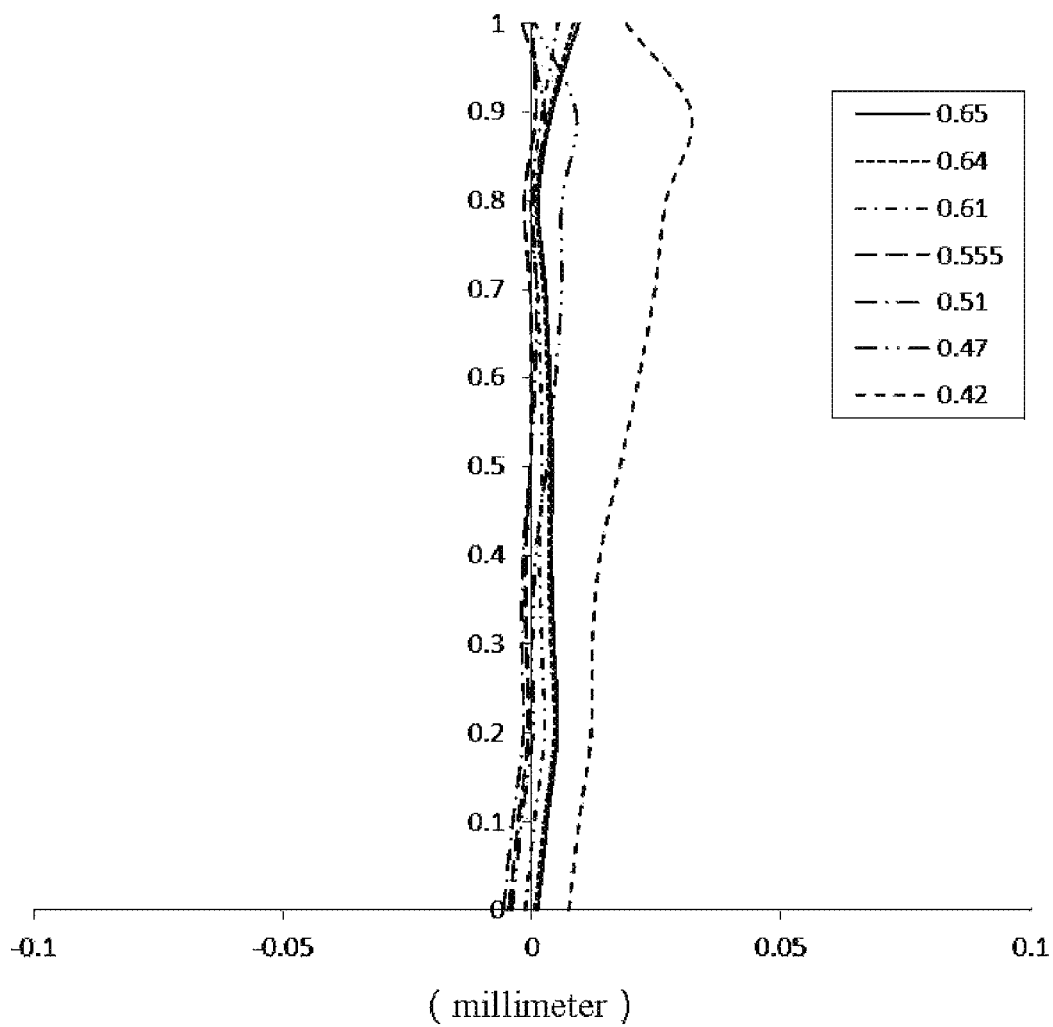
FIG. 12A to FIG. 12D shows a longitudinal aberration curve, astigmatism curve, distortion curve and lateral color curve of an optical imaging lens according to a sixth embodiment respectively.
Figure 12B:
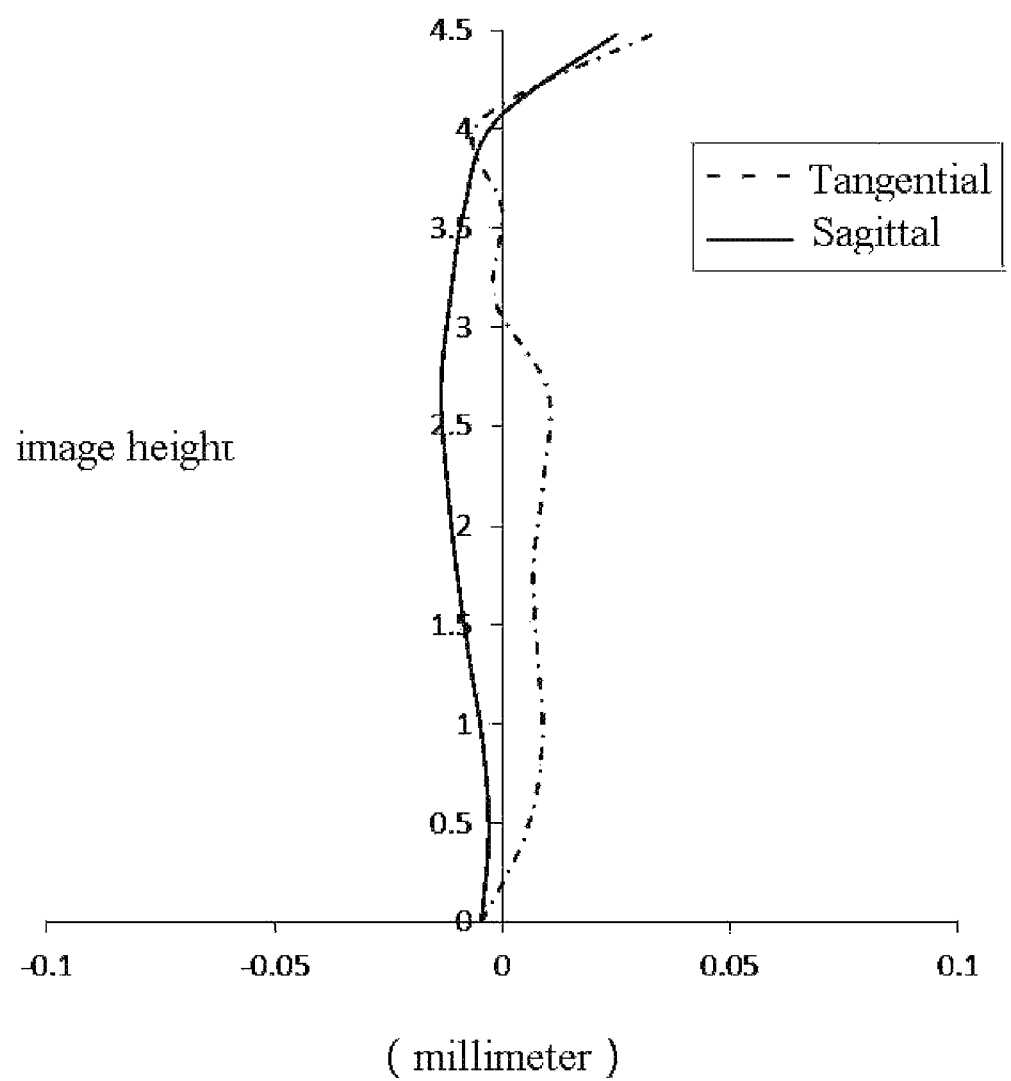

FIG. 12A shows a longitudinal aberration curve of the optical imaging lens according to embodiment 6 to represent deviation of a convergence focal point after light with different wavelengths passes through the lens. FIG. 12B shows an astigmatism curve of the optical imaging lens according to embodiment 6 to represent a tangential image surface curvature and a sagittal image surface curvature.

TABLE 12

| Surface number | A4 | A6 | A8 | A10 | A12 |
|---|---|---|---|---|---|
| S1 | −2.1865E−02 | −1.6569E−03 | −3.7278E−03 | 5.2156E−03 | −4.2560E−03 |
| S2 | −4.7607E−02 | −1.3697E−02 | −9.5229E−04 | 8.8253E−03 | −5.2986E−03 |
| S3 | −1.7707E−02 | −1.1656E−02 | −1.2913E−03 | 5.6296E−03 | −1.3743E−03 |
| S4 | 1.2582E−02 | −9.2804E−03 | −6.0006E−03 | 1.1155E−02 | −6.8997E−03 |
| S5 | −5.5014E−02 | 2.3593E−02 | −3.4448E−02 | 3.5967E−02 | −2.2642E−02 |
| S6 | −7.2926E−02 | 3.8088E−02 | −3.8641E−02 | 3.3133E−02 | −1.9644E−02 |
| S7 | 6.3567E−03 | −1.2596E−02 | 2.2557E−02 | −2.8764E−02 | 2.3321E−02 |
| S8 | 6.4582E−03 | −2.0171E−02 | 3.3701E−02 | −3.9337E−02 | 2.9445E−02 |
| S9 | −2.0019E−02 | 4.1079E−03 | −7.3642E−03 | 1.1405E−02 | −1.1669E−02 |
| S10 | −5.3620E−02 | 2.8368E−02 | −1.7480E−02 | 1.1748E−02 | −8.0064E−03 |
| S11 | 1.2804E−02 | 2.5255E−02 | −2.2726E−02 | 9.8694E−03 | −2.7986E−03 |
| S12 | −1.5285E−02 | 4.0613E−02 | −3.4436E−02 | 2.0304E−02 | −8.6189E−03 |
| S13 | 5.9420E−03 | −2.9864E−03 | −6.3777E−03 | 4.3943E−03 | −1.6368E−03 |
| S14 | 3.5521E−02 | −2.5435E−02 | 6.3737E−03 | −9.5780E−04 | 7.7644E−05 |
| S15 | −6.9278E−02 | 8.7572E−03 | 3.0854E−04 | −1.0698E−04 | −4.4446E−06 |
| S16 | −5.9548E−02 | 1.5728E−02 | −3.8627E−03 | 7.3657E−04 | −9.9003E−05 |

| Surface number | A14 | A16 | A18 | A20 |
|---|---|---|---|---|
| S1 | 2.0127E−03 | −5.2877E−04 | 7.2548E−05 | −4.0920E−06 |
| S2 | 1.6591E−03 | −3.1220E−04 | 3.3812E−05 | −1.6454E−06 |
| S3 | −3.4700E−04 | 2.0149E−04 | −3.1043E−05 | 1.5131E−06 |
| S4 | 2.2600E−03 | −4.0668E−04 | 3.6539E−05 | −1.2043E−06 |
| S5 | 8.5360E−03 | −1.8927E−03 | 2.2812E−04 | −1.1556E−05 |
| S6 | 7.3245E−03 | −1.6223E−03 | 1.9211E−04 | −9.3506E−06 |
| S7 | −1.1872E−02 | 3.7602E−03 | −6.7876E−04 | 5.2786E−05 |
| S8 | −1.4260E−02 | 4.3532E−03 | −7.5704E−04 | 5.6701E−05 |
| S9 | 7.2111E−03 | −2.7113E−03 | 5.6265E−04 | −4.8251E−05 |
| S10 | 4.1216E−03 | −1.3390E−03 | 2.3850E−04 | −1.7420E−05 |
| S11 | 8.1595E−04 | −2.0814E−04 | 2.9784E−05 | −1.6752E−06 |
| S12 | 2.5919E−03 | −4.9404E−04 | 5.1810E−05 | −2.2549E−06 |
| S13 | 3.8136E−04 | −5.4299E−05 | 4.2710E−06 | −1.4069E−07 |
| S14 | −1.2778E−07 | −6.5238E−07 | 5.8610E−08 | −1.7187E−09 |
| S15 | 2.4199E−06 | −2.3767E−07 | 1.0380E−08 | −1.7812E−10 |
| S16 | 9.1164E−06 | −5.4478E−07 | 1.8800E−08 | −2.8151E−10 |

Figure 12C:
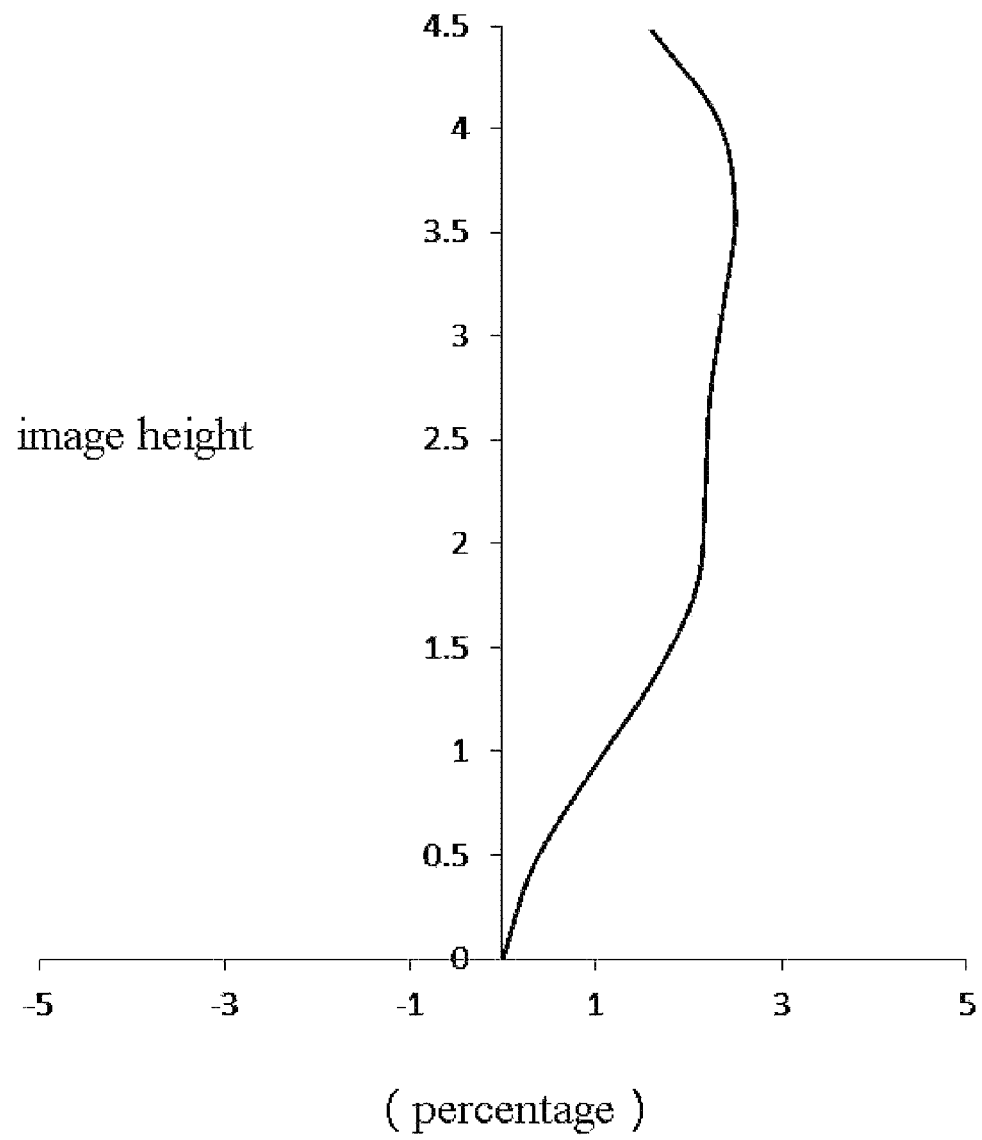
Figure 12D:
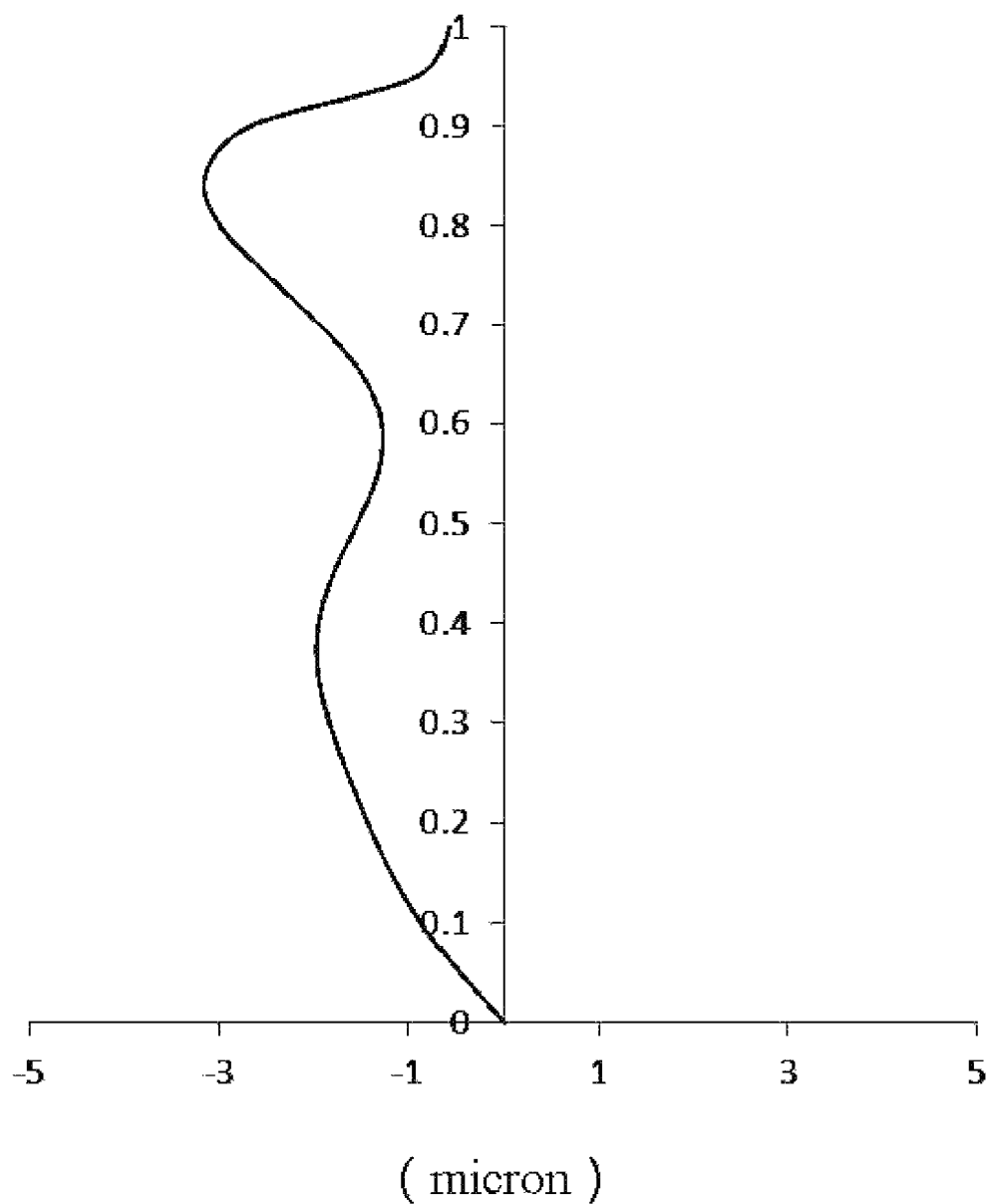

FIG. 12C shows a distortion curve of the optical imaging lens according to embodiment 6 to represent distortion values corresponding to different image heights. FIG. 12D shows a lateral color curve of the optical imaging lens according to embodiment 6 to represent deviation of different image heights on the imaging surface after the light passes through the lens. According to FIG. 12A to FIG. 12D, it can be seen that the optical imaging lens provided in embodiment 6 may achieve high imaging quality.

Embodiment 7

Figure 13:
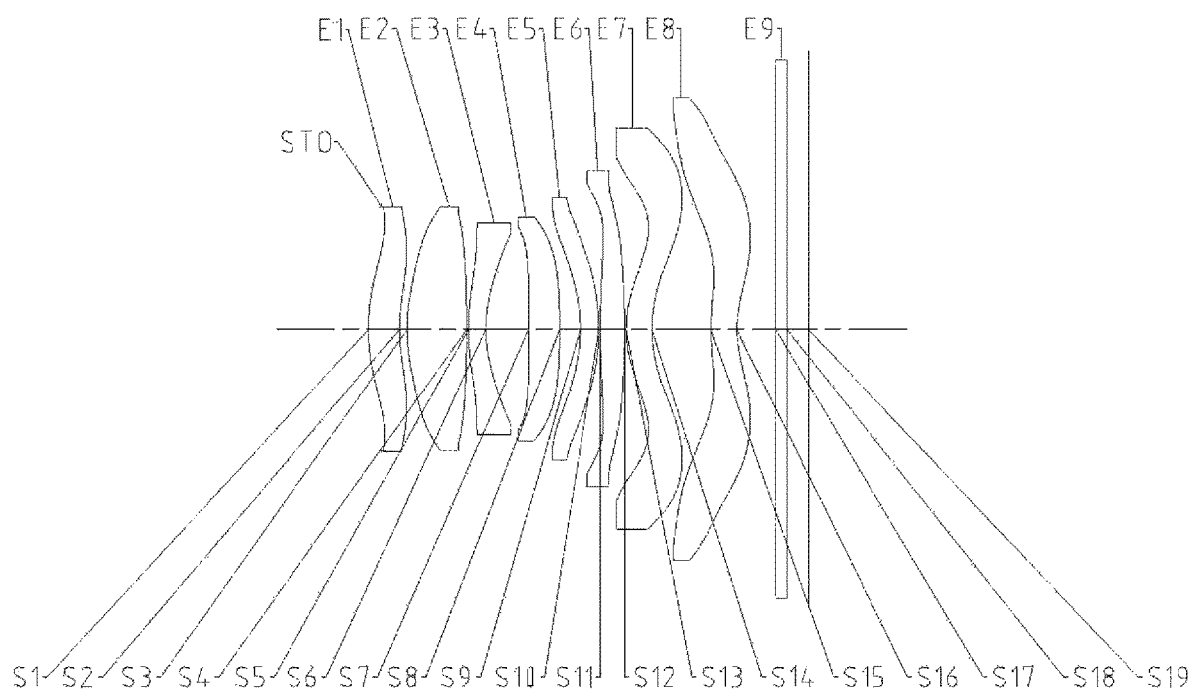
FIG. 13 is a schematic structural view of an optical imaging lens according to a seventh embodiment of the disclosure.

The optical imaging lens according to embodiment 7 of the disclosure will be described below with reference to FIG. 13 to FIG. 14D. FIG. 13 shows a schematic structural view of the optical imaging lens according to embodiment 7 of the disclosure.

As shown in FIG. 13, an optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7, an eighth lens E8, a filter E9 and an imaging surface S19.

The first lens E1 has the positive refractive power, an object-side surface S1 thereof is a convex surface, and an image-side surface S2 is a concave surface. The second lens E2 has the positive refractive power, an object-side surface S3 thereof is a convex surface, and an image-side surface S4 is a convex surface. The third lens E3 has the negative refractive power, an object-side surface S5 thereof is a convex surface, and an image-side surface S6 is a concave surface. The fourth lens E4 has the positive refractive power, an object-side surface S7 thereof is a convex surface, and an image-side surface S8 is a convex surface. The fifth lens E5 has the negative refractive power, an object-side surface S9 thereof is a concave surface, and an image-side surface S10 is a convex surface. The sixth lens E6 has the positive refractive power, an object-side surface S11 thereof is a convex surface, and an image-side surface S12 is a convex surface. The seventh lens E7 has the positive refractive power, an object-side surface S13 thereof is a convex surface, and an image-side surface S14 is a concave surface. The eighth lens E8 has the negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

In the embodiment, the total effective focal length f of the optical imaging lens is 6.37 mm, the distance TTL from the object-side surface S1 of the first lens E1 to the imaging surface S19 on the optical axis is 8.20 mm, and the maximum FOV of the optical imaging lens is 77.5 degrees.

Table 13 shows basic parameters of the optical imaging lens of embodiment 7, in which the units of curvature radius, thickness/distance and focal length are millimeter (mm).

TABLE 13

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.2543 | | | | |
| S1 | Aspherical | 3.5885 | 0.5766 | 1.546 | 56.11 | 75.07 | −0.3933 |
| S2 | Aspherical | 3.7097 | 0.1423 | | | | −0.1356 |
| S3 | Aspherical | 3.5422 | 1.1152 | 1.546 | 56.11 | 5.45 | 0.2009 |
| S4 | Aspherical | −16.4936 | 0.0300 | | | | −24.7367 |
| S5 | Aspherical | 4.2435 | 0.3200 | 1.666 | 20.40 | −9.70 | 0.6862 |
| S6 | Aspherical | 2.4854 | 0.7964 | | | | −0.0145 |
| S7 | Aspherical | 72.8760 | 0.5832 | 1.546 | 56.11 | 22.20 | −99.0000 |
| S8 | Aspherical | −14.4974 | 0.3863 | | | | 30.8498 |
| S9 | Aspherical | −2.8416 | 0.3500 | 1.678 | 19.25 | −20.05 | −0.8574 |
| S10 | Aspherical | −3.7720 | 0.0300 | | | | 0.3449 |
| S11 | Aspherical | 24.6761 | 0.4500 | 1.570 | 37.32 | 19.63 | −99.0000 |
| S12 | Aspherical | −20.3548 | 0.0300 | | | | 27.8334 |
| S13 | Aspherical | 2.2684 | 0.4800 | 1.546 | 56.11 | 18.31 | −4.0103 |
| S14 | Aspherical | 2.7150 | 1.0961 | | | | −3.3514 |
| S15 | Aspherical | 3.4150 | 0.4800 | 1.536 | 55.74 | −9.02 | −18.5957 |
| S16 | Aspherical | 1.9044 | 0.7282 | | | | −5.6888 |
| S17 | Spherical | Infinite | 0.2100 | 1.517 | 64.17 | | |
| S18 | Spherical | Infinite | 0.4000 | | | | |
| S19 | Spherical | Infinite | | | | | |

In embodiment 7, both an object-side surface and an image-side surface of any lens in the first lens E1 to the eighth lens E8 are aspheric surfaces. Table 14 shows the higher-order coefficients A4, A6, A8, A10, A12, A14, A16, A18 and A20 applicable to the aspherical mirror surfaces S1-S16 in embodiment 7.

TABLE 14

| Surface number | A4 | A6 | A8 | A10 | A12 |
|---|---|---|---|---|---|
| S1 | −1.0577E−02 | −5.9466E−04 | −1.9603E−03 | 1.7982E−03 | −1.0673E−03 |
| S2 | −2.9817E−02 | −6.3798E−03 | −2.8189E−04 | 2.3480E−03 | −1.0184E−03 |
| S3 | −1.3875E−02 | −5.2825E−03 | −5.2917E−04 | 1.8517E−03 | −3.6648E−04 |

TABLE 14-continued

| | | | | | |
|---|---|---|---|---|---|
| S4 | 1.6151E−02 | −1.2661E−02 | 3.1835E−03 | 8.2261E−04 | −8.7756E−04 |
| S5 | −3.3715E−02 | 1.0415E−02 | −1.2139E−02 | 1.0299E−02 | −5.3205E−03 |
| S6 | −5.1269E−02 | 2.5198E−02 | −1.9790E−02 | 1.3302E−02 | −6.4963E−03 |
| S7 | −8.2667E−03 | −4.6350E−03 | 6.8609E−03 | −7.3832E−03 | 4.9955E−03 |
| S8 | −3.5869E−02 | −1.4957E−02 | 1.4087E−02 | −1.0056E−02 | 4.9832E−03 |
| S9 | 4.6207E−02 | −4.4161E−02 | 3.1195E−02 | −1.4385E−02 | 4.4275E−03 |
| S10 | 2.3145E−02 | −2.5629E−02 | 1.8376E−02 | −7.9339E−03 | 2.2598E−03 |
| S11 | 6.0782E−03 | −9.8176E−04 | −9.9341E−04 | 5.3485E−04 | −2.1461E−04 |
| S12 | −7.1508E−02 | 8.0259E−03 | −4.3681E−03 | 1.2398E−03 | −2.3409E−04 |
| S13 | 3.1800E−03 | −4.2907E−03 | −9.9983E−05 | −1.0038E−04 | 6.9943E−05 |
| S14 | 1.3618E−02 | −5.6307E−03 | −8.2822E−04 | 5.9403E−04 | −1.2081E−04 |
| S15 | −6.2633E−02 | 1.0618E−02 | −5.4593E−04 | −6.2787E−05 | 1.3243E−05 |
| S16 | −4.4806E−02 | 1.0219E−02 | −1.8730E−03 | 2.5221E−04 | −2.5269E−05 |

| Surface number | A14 | A16 | A18 | A20 |
|---|---|---|---|---|
| S1 | 3.6965E−04 | −7.1537E−05 | 7.2797E−06 | −3.0591E−07 |
| S2 | 2.1209E−04 | −2.3988E−05 | 1.3858E−06 | −3.0951E−08 |
| S3 | −7.3692E−05 | 3.5679E−05 | −4.7402E−06 | 2.1814E−07 |
| S4 | 2.8204E−04 | −4.5914E−05 | 3.8333E−06 | −1.3246E−07 |
| S5 | 1.6644E−03 | −3.0865E−04 | 3.1580E−05 | −1.3930E−06 |
| S6 | 2.1207E−03 | −4.3633E−04 | 5.1456E−05 | −2.6610E−06 |
| S7 | −2.1932E−03 | 5.9638E−04 | −9.1985E−05 | 6.1618E−06 |
| S8 | −1.6408E−03 | 3.4329E−04 | −4.1545E−05 | 2.2191E−06 |
| S9 | −8.8134E−04 | 1.0821E−04 | −7.4278E−06 | 2.1642E−07 |
| S10 | −4.3124E−04 | 5.3506E−05 | −3.8794E−06 | 1.2313E−07 |
| S11 | 5.7694E−05 | −9.3273E−06 | 8.1102E−07 | −2.8763E−08 |
| S12 | 3.2776E−05 | −3.2105E−06 | 1.8749E−07 | −4.7736E−09 |
| S13 | −1.2205E−05 | 9.5279E−07 | −3.2995E−08 | 3.4433E−10 |
| S14 | 1.3249E−05 | −8.4430E−07 | 2.9407E−08 | −4.3245E−10 |
| S15 | −1.0639E−06 | 4.5347E−08 | −9.8575E−10 | 8.2651E−12 |
| S16 | 1.8548E−06 | −9.0554E−08 | 2.5279E−09 | −2.9986E−11 |

Figure 14A:
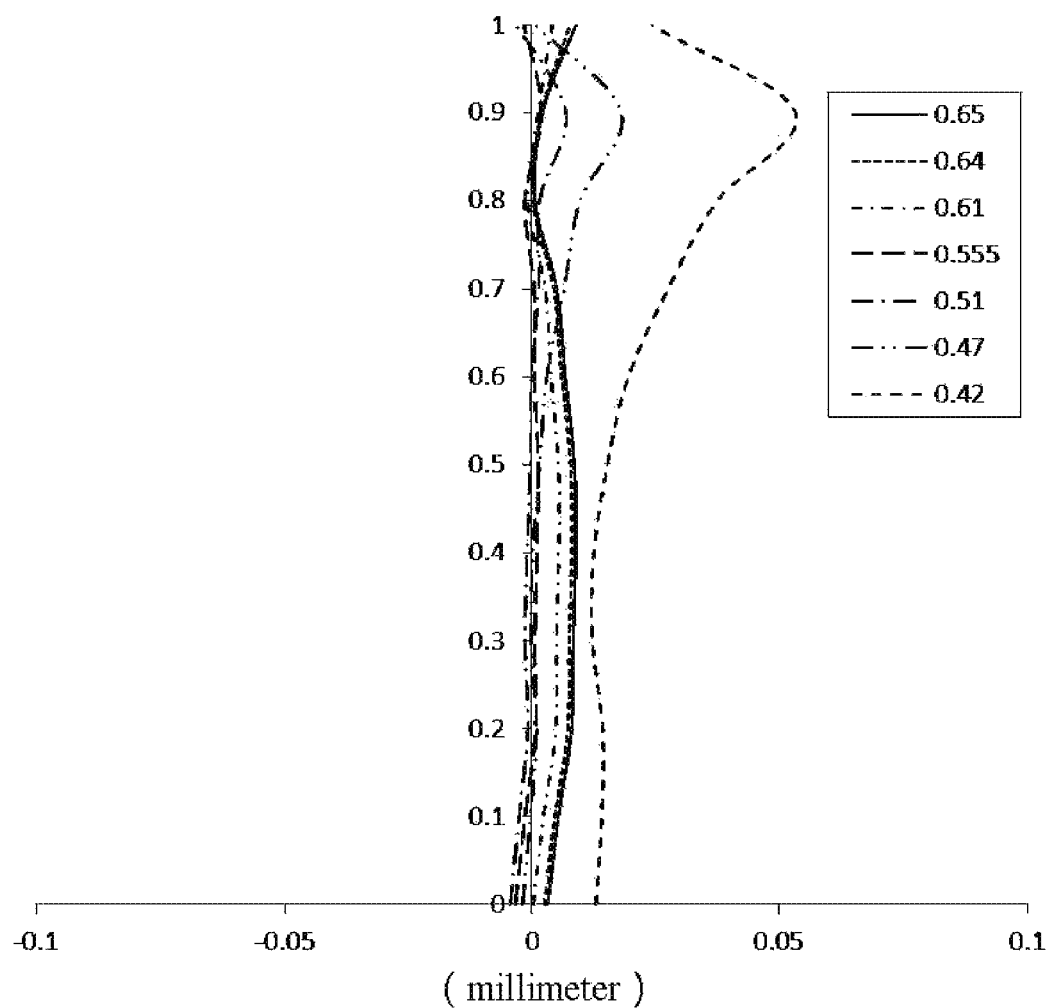
FIG. 14A to FIG. 14D shows a longitudinal aberration curve, astigmatism curve, distortion curve and lateral color curve of an optical imaging lens according to a seventh embodiment respectively.
Figure 14B:
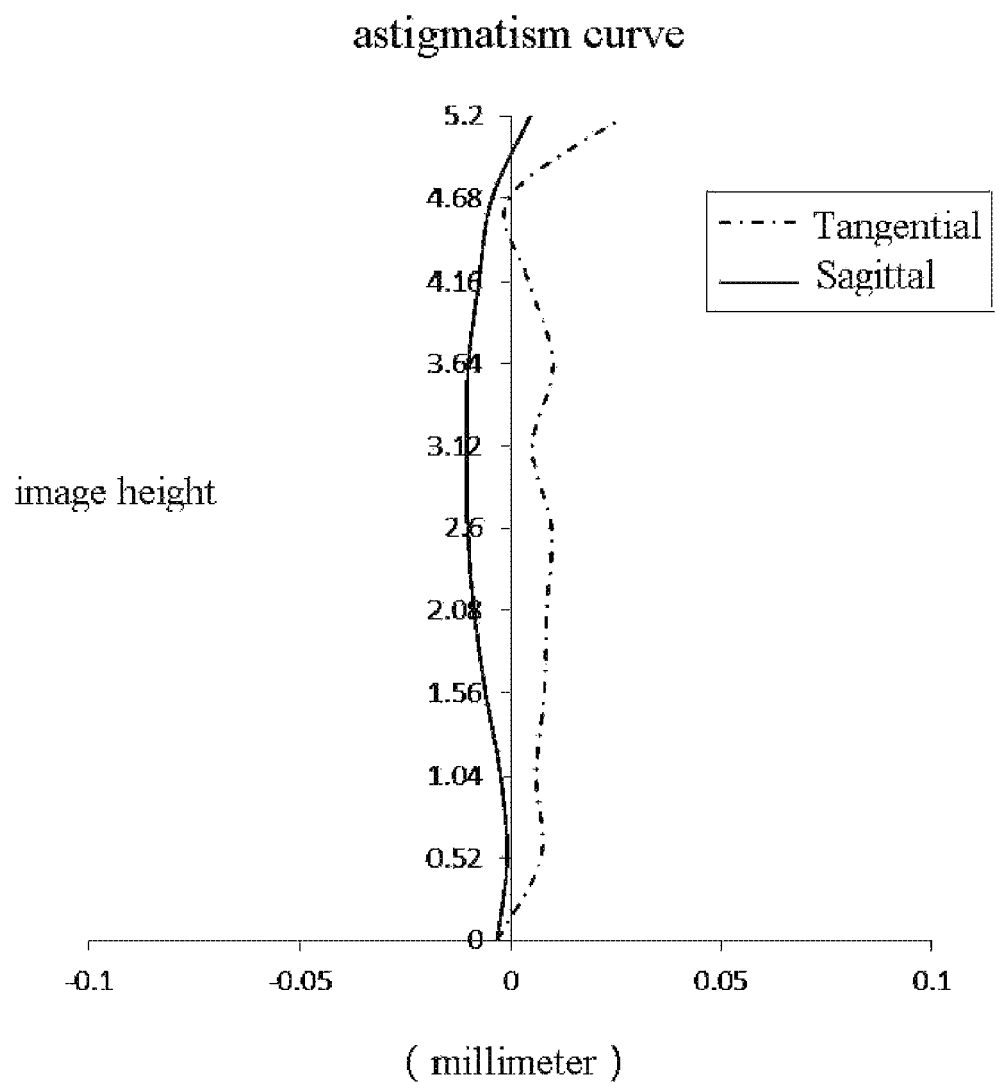
Figure 14C:
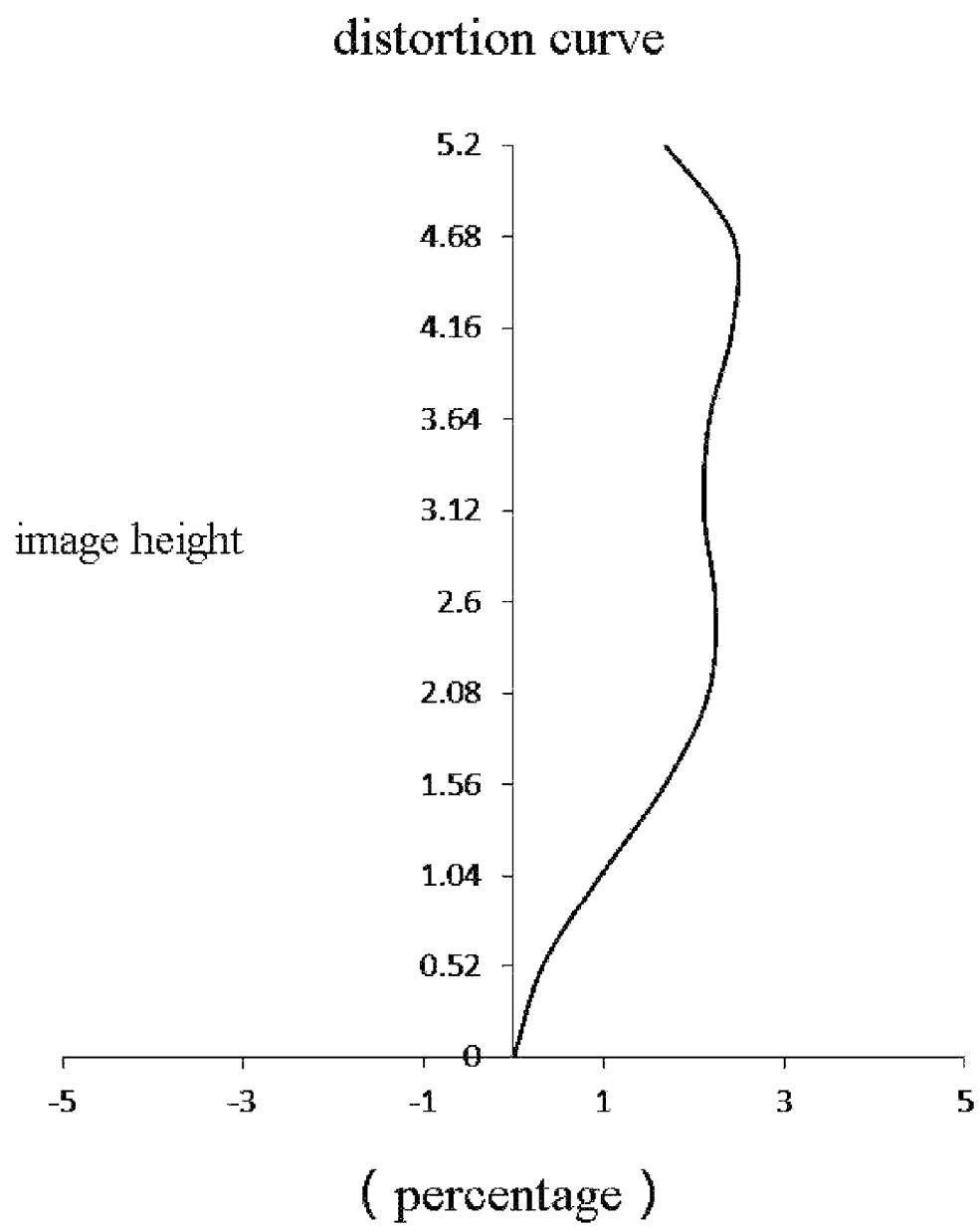
Figure 14D:
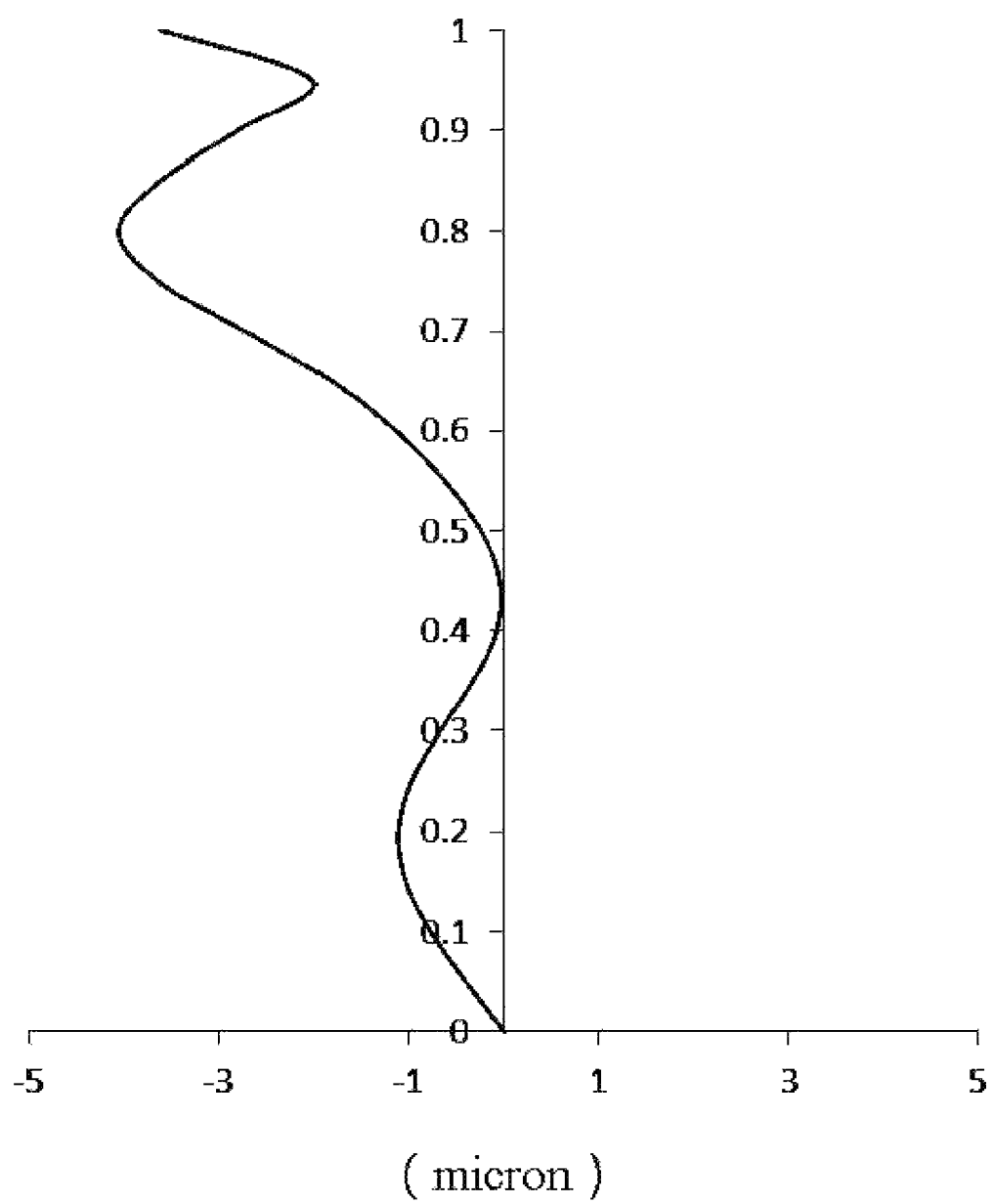

FIG. 14A shows a longitudinal aberration curve of the optical imaging lens according to embodiment 7 to represent deviation of a convergence focal point after light with different wavelengths passes through the lens. FIG. 14B shows an astigmatism curve of the optical imaging lens according to embodiment 7 to represent a tangential image surface curvature and a sagittal image surface curvature. FIG. 14C shows a distortion curve of the optical imaging lens according to embodiment 7 to represent distortion values corresponding to different image heights. FIG. 14D shows a lateral color curve of the optical imaging lens according to embodiment 7 to represent deviation of different image heights on the imaging surface after the light passes through the lens. According to FIG. 14A to FIG. 14D, it can be seen that the optical imaging lens provided in embodiment 7 may achieve high imaging quality.

To sum up, embodiment 1 to embodiment 7 meet the relationship shown in Table 15 respectively.

TABLE 15

| Conditional expressions | Embodiments | | | | | | |
|---|---|---|---|---|---|---|---|
| | 1 | 2 | 3 | 4 | 5 | 6 | 7 |
| f × TAN(HFOV) (mm) | 4.39 | 4.41 | 4.40 | 5.13 | 6.08 | 4.41 | 5.11 |
| f/(CT7 + CT8) | 5.47 | 5.56 | 5.42 | 5.96 | 6.64 | 5.29 | 6.64 |
| TTL/EPD | 1.87 | 1.87 | 1.87 | 1.92 | 1.80 | 1.86 | 1.81 |
| f/R2 | 1.91 | 2.00 | 1.95 | 1.69 | 1.66 | 1.95 | 1.72 |
| f/R10 | −1.89 | −1.34 | −0.65 | −1.21 | −1.58 | −0.66 | −1.69 |
| R4/R3 | −4.10 | −6.12 | −3.18 | −5.00 | −4.58 | −4.11 | −4.66 |
| f/R13 + f/R14 | 4.17 | 4.35 | 4.01 | 4.97 | 5.17 | 3.96 | 5.16 |
| R15/R16 | 1.58 | 1.73 | 1.50 | 1.84 | 1.75 | 1.57 | 1.79 |
| \|f/f3 − f/f8\| | 0.08 | 0.08 | 0.36 | 0.16 | 0.09 | 0.07 | 0.05 |
| f5/f4 | −1.12 | −4.38 | −1.25 | −0.95 | −0.89 | −0.01 | −0.90 |
| f7/f12 | 4.61 | 2.10 | 1.88 | 2.37 | 2.75 | 2.08 | 3.40 |

TABLE 15-continued

| Conditional expressions | Embodiments | | | | | | |
|---|---|---|---|---|---|---|---|
| | 1 | 2 | 3 | 4 | 5 | 6 | 7 |
| f/\|f1\| | 0.04 | 0.09 | 0.01 | 0.26 | 0.09 | 0.06 | 0.08 |
| (V4 + V5 + V6)/3 | 37.56 | 33.07 | 31.54 | 37.56 | 37.56 | 33.07 | 37.56 |
| f/EPD | 1.40 | 1.40 | 1.40 | 1.50 | 1.36 | 1.40 | 1.40 |

The above description is only description about the preferred embodiments of the disclosure and adopted technical principles. Those skilled in the art should know that the scope of present disclosure involved in the disclosure is not limited to the technical solutions formed by specifically combining the technical features and should also cover other technical solutions formed by freely combining the technical features or equivalent features thereof without departing from the inventive concept, for example, technical solutions formed by mutually replacing the features and (but not limited to) the technical features with similar functions disclosed in the disclosure.

What is claimed is:

1. An optical imaging lens, sequentially comprising from an object side to an image side along an optical axis:
   a first lens with refractive power;
   a second lens with positive refractive power;
   a third lens with negative refractive power;
   a fourth lens with refractive power;
   a fifth lens with refractive power;
   a sixth lens with refractive power;
   a seventh lens with positive refractive power; and
   an eighth lens with negative refractive power;
   wherein, a total effective focal length f of the optical imaging lens and a maximum Field of View (FOV) of the optical imaging lens meet f×TAN(FOV/2)>4.0 mm; and the total effective focal length f of the optical imaging lens, a center thickness CT7 of the seventh lens on the optical axis and a center thickness CT8 of the eighth lens on the optical axis meet:

f/(CT7+CT8)≥5.0;

the total effective focal length f of the optical imaging lens, a curvature radius R13 of an object-side surface of the seventh lens and a curvature radius R14 of an image-side surface of the seventh lens meet:

f/R13+f/R14>3.5.

2. The optical imaging lens as claimed in claim 1, wherein a distance TTL from an object-side surface of the first lens to an imaging surface S of the optical imaging lens on the optical axis and an Entrance Pupil Diameter (EPD) of the optical imaging lens meet:

TTL/EPD≤2.0.

3. The optical imaging lens as claimed in claim 1, wherein the total effective focal length f of the optical imaging lens and a curvature radius R2 of an image-side surface of the first lens meet:

f/R2>1.5.

4. The optical imaging lens as claimed in claim 1, wherein the total effective focal length f of the optical imaging lens and a curvature radius R10 of an image-side surface of the fifth lens meet:

f/R10<−0.5.

5. The optical imaging lens as claimed in claim 1, wherein a curvature radius R3 of an object-side surface of the second lens and a curvature radius R4 of an image-side surface of the second lens meet: −10<R4/R3<−3.0.

6. The optical imaging lens as claimed in claim 1, wherein a curvature radius R15 of an object-side surface of the eighth lens and a curvature radius R16 of an image-side surface of the eighth lens meet:

1<R15/R16<2.

7. The optical imaging lens as claimed in claim 1, wherein the total effective focal length f of the optical imaging lens, an effective focal length f3 of the third lens, and an effective focal length f8 of the eighth lens meet:

|f/f3−f/f8|<0.5.

8. The optical imaging lens as claimed in claim 1, wherein an effective focal length f5 of the fifth lens and an effective focal length f4 of the fourth lens meet: −5.0<f5/f4<0.

9. The optical imaging lens as claimed in claim 1, wherein an effective focal length f7 of the seventh lens and a combined focal length f12 of the first lens and the second lens meet 1.5<f7/f12<5.0.

10. The optical imaging lens as claimed in claim 1, wherein a total effective focal length f of the optical imaging lens and an effective focal length f1 of the first lens meet f/|f1|≤0.3.

11. The optical imaging lens as claimed in claim 1, wherein an abbe number V4 of the fourth lens, an abbe number V5 of the fifth lens and an abbe number V6 of the sixth lens meet 30<(V4+V5+V6)/3<40.

12. The optical imaging lens as claimed in claim 1, wherein a total effective focal length f of the optical imaging lens and an EPD of the optical imaging lens meet f/EPD≤1.5.

* * * * *